United States Patent
Desai et al.

(10) Patent No.: US 10,225,380 B2
(45) Date of Patent: Mar. 5, 2019

(54) SYSTEMS AND METHODS FOR A SUBFRAME STRUCTURE FOR WIDEBAND LTE

(71) Applicant: Futurewei Technologies, Inc., Plano, TX (US)

(72) Inventors: Vipul Desai, Palatine, IL (US); Philippe Sartori, Plainfield, IL (US); Lukasz Krzymien, Rolling Meadows, IL (US); Carmela Cozzo, San Diego, CA (US); Weimin Xiao, Hoffman Estates, IL (US); Qian Cheng, Aurora, IL (US)

(73) Assignee: Futurewei Technologies, Inc., Plano, TX (US)

( * ) Notice: Subject to any disclaimer, the term of this patent is extended or adjusted under 35 U.S.C. 154(b) by 94 days.

(21) Appl. No.: 15/162,293

(22) Filed: May 23, 2016

(65) Prior Publication Data

US 2016/0353443 A1    Dec. 1, 2016

Related U.S. Application Data

(60) Provisional application No. 62/168,152, filed on May 29, 2015.

(51) Int. Cl.
*H04L 29/06* (2006.01)
*H04L 5/00* (2006.01)
(Continued)

(52) U.S. Cl.
CPC ............ *H04L 69/22* (2013.01); *H04L 5/0092* (2013.01); *H04L 5/1469* (2013.01);
(Continued)

(58) Field of Classification Search
CPC ..... H04L 69/22; H04L 5/0092; H04L 5/1469; H04L 27/2602; H04L 5/0055; H04W 72/042

See application file for complete search history.

(56) References Cited

U.S. PATENT DOCUMENTS

| | | | |
|---|---|---|---|
| 2009/0109914 A1 | 4/2009 | McBeath et al. | |
| 2013/0051272 A1 | 2/2013 | Wilberg et al. | |

(Continued)

FOREIGN PATENT DOCUMENTS

| | | | |
|---|---|---|---|
| CN | 102223214 A | 10/2011 | |
| CN | 102246442 A | 11/2011 | |

(Continued)

OTHER PUBLICATIONS

"Combination of ACK/NACKs for TDD," Source: Ericsson, Agenda Item: 6.1.4, Document for: Discussion and Decision, TSG-RAN WG1 #52, R1-080870, Sorrento, Italy, Feb. 11-15, 2008, 2 pages.

(Continued)

*Primary Examiner* — Jae Y Lee
(74) *Attorney, Agent, or Firm* — Slater Matsil, LLP

(57) ABSTRACT

System and method embodiments are provided for a subframe structure for wideband LTE. In an embodiment, a method in a communications controller for transmitting a packet to a wireless device includes signaling a UL/DL configuration to the wireless device, wherein the UL/DL configuration indicates a quantity of uplink microframes in a group of microframes, wherein each subframe includes a plurality of microframes, and wherein the group of microframes includes a consecutive sequence downlink microframes and a consecutive sequence of uplink microframes. The packet is transmitted to the wireless device in one downlink microframe. The method further includes receiving an acknowledgement of the packet in an uplink microframe, wherein the uplink microframe is determined in (Continued)

accordance with the one downlink microframe and the uplink-downlink configuration, and wherein the acknowledgement is received in a same subframe as a subframe utilized for transmitting the packet to the wireless device.

24 Claims, 13 Drawing Sheets

(51) Int. Cl.
  *H04L 27/26*   (2006.01)
  *H04W 72/04*   (2009.01)
  *H04L 5/14*   (2006.01)

(52) U.S. Cl.
  CPC ....... *H04L 27/2602* (2013.01); *H04W 72/042* (2013.01); *H04L 5/0055* (2013.01)

(56) References Cited

U.S. PATENT DOCUMENTS

| | | |
|---|---|---|
| 2013/0077638 A1 | 3/2013 | Kim et al. |
| 2013/0336160 A1 | 12/2013 | Yin et al. |
| 2014/0328260 A1* | 11/2014 | Papasakellariou ........................... H04W 72/1289 370/329 |
| 2015/0173069 A1* | 6/2015 | Cucala Garcia .. H04W 72/1289 370/329 |
| 2015/0188690 A1* | 7/2015 | Khoryaev ......... H04W 52/0251 370/280 |
| 2016/0043831 A1* | 2/2016 | Seo ....................... H04L 1/1607 714/748 |
| 2016/0044663 A1* | 2/2016 | Yao ....................... H04W 80/00 370/336 |
| 2016/0270116 A1* | 9/2016 | Lin .................... H04W 72/1289 |
| 2016/0353476 A1 | 12/2016 | Sartori et al. |
| 2017/0041119 A1 | 2/2017 | Ang et al. |
| 2017/0332286 A1 | 11/2017 | Lepp et al. |

FOREIGN PATENT DOCUMENTS

| | | |
|---|---|---|
| CN | 104521304 A | 4/2015 |
| CN | 102246442 B | 2/2016 |

OTHER PUBLICATIONS

"LTE; Evolved Universal Terrestrial Radio Access (E-UTRA); Physical Channels and Modulation (3GPP TS 36.211 Version 10.0.0 Release 10)," ETSI TS 136 211 V10.0.0, Technical Specification, Jan. 2011, 105 pages.

* cited by examiner

SYSTEMS AND METHODS FOR A SUBFRAME STRUCTURE FOR WIDEBAND LTE

This application claims priority to U.S. Provisional Application Ser. No. 62/168,152, filed on May 29, 2015 entitled "System and Method for a Subframe Structure for Wideband LTE," which application is hereby incorporated herein by reference.

CROSS-REFERENCE TO RELATED APPLICATION

This patent application is related to U.S. patent application Ser. No. 15/162,202, filed May 23, 2016 which is incorporated by reference herein as if reproduced in its entirety.

TECHNICAL FIELD

The present invention relates to a system and method for wireless communications, and, in particular embodiments, to a system and method for a subframe structure for wideband LTE.

BACKGROUND

The current spectrum allocation for cellular systems is becoming inadequate in capacity as the number of users and volume of traffic increases. To increase the amount of spectrum available for cellular usage, the cellular industry (e.g., operators, system manufacturers, and device manufacturers) are targeting newer frequency bands. These frequency bands are higher in frequency (e.g., 3.5 GHz-6 GHz) than the traditional cellular bands (e.g., 700 MHz to 2.5 GHz), typically larger in contiguous bandwidth (e.g., up to 400 MHz) compared to the typical maximum of 20 MHz, and most likely unpaired (only one band is available for transmission and reception).

SUMMARY

An embodiment method in a communications controller for transmitting a packet to a wireless device includes signaling, by the communications controller, an uplink/downlink (UL/DL) configuration to the wireless device, wherein the UL/DL configuration indicates a quantity of uplink microframes in a group of microframes, wherein each subframe includes a plurality of microframes, and wherein the group of microframes includes a consecutive sequence downlink microframes and a consecutive sequence of uplink microframes. The method also includes transmitting, by the communications controller, the packet to the wireless device in one downlink microframe of the consecutive sequence of downlink microframes. The method further includes receiving, by the communications controller, an acknowledgement of the packet in an uplink microframe, wherein the uplink microframe is determined in accordance with the one downlink microframe and the uplink-downlink configuration, and wherein the acknowledgement is received in a same subframe as a subframe utilized for transmitting the packet to the wireless device.

In an embodiment, the consecutive sequence of downlink microframes includes a special microframe, and wherein the special microframe includes at least one downlink symbol and a guard period. In an embodiment, the uplink microframes are further determined in accordance with a next uplink-downlink configuration of a next group of microframes. In an embodiment, a subframe is divided into eight microframes, wherein K first microframes are UL. In an embodiment, a plurality of subframes comprise a supermicroframe, wherein a K first microframes in a first subframe are DL microframes and a first microframe in each of the subsequent subframes are a DL microframe or an UL microframe. In an embodiment, the method also includes signaling the UL/DL configuration using a physical control format indicator channel (PCFICH)-like channel. In an embodiment, signaling the UL/DL configuration using a physical control format indicator channel (PCFICH)-like channel includes sending the PCFICH-like channel on at least one reserved resource element (RE) in a first microframe of a first subframe. In an embodiment, the method includes explicitly signaling a subframe in which to send an acknowledgement/negative acknowledgement (ACK/NAK). In an embodiment, the explicit signaling includes one bit indicating whether to send the ACK/NACK using an implicit rule or a pre-determined microframe.

An embodiment communications controller includes a processor and a non-transitory computer readable storage medium storing programming for execution by the processor. The programming includes instructions for signaling an uplink/downlink (UL/DL) configuration to the wireless device, wherein the UL/DL configuration indicates a quantity of uplink microframes in a group of microframes. Each subframe includes a plurality of microframes. The group of microframes includes a consecutive sequence downlink microframes and a consecutive sequence of uplink microframes. The programming also includes instructions for transmitting the packet to the wireless device in one downlink microframe of the consecutive sequence of downlink microframes. The programming further includes instructions for receiving an acknowledgement of the packet in an uplink microframe. The uplink microframe is determined in accordance with the one downlink microframe and the uplink-downlink configuration. The acknowledgement is received in a same subframe as a subframe utilized for transmitting the packet to the wireless device.

An embodiment method in a wireless device for communicating with a communications controller includes receiving, by the wireless device, an uplink/downlink (UL/DL) configuration from the communications controller. The UL/DL configuration indicates a quantity of uplink microframes in a group of microframes. Each subframe includes a plurality of microframes. The group of microframes includes a consecutive sequence downlink microframes and a consecutive sequence of uplink microframes. The method also includes receiving, by the wireless device, a packet from the communications controller in one downlink microframe of the consecutive sequence of downlink microframes. The method further includes transmitting, by the wireless device, an acknowledgement of the packet in an uplink microframe. The uplink microframe is determined in accordance with the one downlink microframe and the uplink-downlink configuration. The acknowledgement is transmitted in a same subframe as a subframe utilized for receiving the packet from the communications controller.

In an embodiment, the consecutive sequence of downlink microframes includes a special microframe, and wherein the special microframe includes at least one downlink symbol and a guard period. In an embodiment, the uplink microframes are further determined in accordance with a next uplink-downlink configuration of a next group of microframes. In an embodiment, a subframe is divided into eight microframes, wherein K first microframes are UL. In an embodiment, a plurality of subframes comprise a supermicroframe, wherein a K first microframes in a first subframe are DL microframes and a first microframe in each of the subsequent subframes are a DL microframe or an UL microframe.

An embodiment wireless device includes a processor and a non-transitory computer readable storage medium storing programming for execution by the processor. The programming includes instructions for receiving an uplink/downlink (UL/DL) configuration from the communications controller. The UL/DL configuration indicates a quantity of uplink microframes in a group of microframes. Each subframe includes a plurality of microframes. The group of microframes includes a consecutive sequence of downlink microframes and a consecutive sequence of uplink microframes. The programming also includes instructions for receiving a packet from the communications controller in one downlink microframe of the consecutive sequence of downlink microframes. The programming also includes transmitting an acknowledgement of the packet in an uplink microframe. The uplink microframe is determined in accordance with the one downlink microframe and the uplink-downlink configuration. The acknowledgement is transmitted in a same subframe as a subframe utilized for receiving the packet from the communications controller.

In various embodiments, simpler ACK/NAK timing rules are provided as compared against legacy TDD design for LTE. Embodiments provide for low latency and dynamic downlink/uplink configurations.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
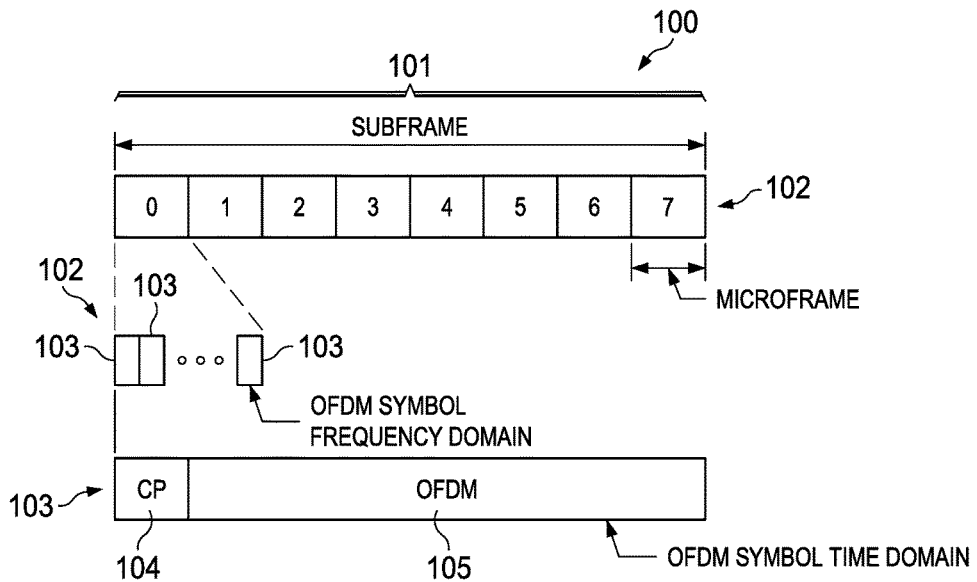
FIG. 1 illustrates an embodiment of a microframe.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In order to operate at higher frequencies and wider bandwidths, the cellular industry has several options. One option is to use carrier aggregation (CA) to enable multiple 20 MHz carriers to fill the available bandwidths. Another option is enhance the physical layer of Long Term Evolution (LTE) to operate with larger bandwidths. While the first option is attractive by just changing the carrier frequency to the higher frequencies, it maintains the design features and accompanying issues of the current LTE system (latency, overhead). The second option would need changes but allows design for lower latency, reduced overhead, and higher throughput.

Legacy time division duplexing (TDD) design for LTE has a number of shortcomings. First, LTE TDD was designed after LTE frequency division duplexing (FDD). The legacy LTE TDD design includes seven subframe configurations. Subframe (SF) 2 is always an UL subframe. SFs 0 and 5 are always downlink (DL) SFs. SF 1 is always a special SF. SF 6 can be either a DL SF or a special SF An additional benefit provided by developing wideband LTE is a reduction in the current LTE latency. The current LTE subframe structure is not suitable to achieve the latencies typically considered for fifth generation (5G) systems (e.g., 1 ms). Therefore, there is a need for a new subframe structure for wideband LTE.

An embodiment method for transmitting a packet to a wireless device includes signaling, by a communications controller, an uplink/downlink (UL/DL) configuration to the wireless device, wherein the UL/DL configuration indicates a quantity of uplink microframes in a group of microframes. The group of microframes includes a consecutive sequence downlink microframes and a consecutive sequence of uplink microframes. The method also includes transmitting, by the communications controller, the packet to the wireless device in one downlink microframe of the consecutive sequence of downlink microframes. Additionally, the method includes receiving, by the communications controller, an acknowledgement of the packet in an uplink microframe. The uplink microframe is determined in accordance with the one downlink microframe and the uplink-downlink configuration. In an embodiment, the consecutive sequence of downlink microframes includes a special microframe, and wherein the special microframe includes downlink symbols and a guard period. In an embodiment, the uplink microframe is further determined in accordance with a next uplink-downlink configuration of a next group of microframes. In an embodiment, the quantity of uplink microframes is related to the consecutive sequence of uplink microframes. In an embodiment, a subframe is divided into eight microframes, wherein K first microframes are UL, and wherein a supermicroframe includes a first subframe having K first microframes being DL, and subsequent subframes after the first subframe have the K first microframes being UL or DL. In an embodiment, the method also includes signaling the UL/DL configuration using a physical control format indicator channel (PCFICH)-like channel sent on reserved resource elements (REs) in microframe 0 of subframe 0. In an embodiment, the method also includes explicitly signaling of a subframe in which to send an acknowledgement/negative acknowledgement (ACK/NAK). In an embodiment, the explicit signaling includes one bit indicating whether to send the ACK/NACK using an implicit rule or a pre-determined microframe.

An embodiment communications controller includes a processor and a non-transitory computer readable storage medium storing programming for execution by the processor. The programming includes instructions for signaling an uplink/downlink (UL/DL) configuration to a wireless device. The UL/DL configuration indicates a quantity of uplink microframes in a group of microframes. The group of microframes includes a consecutive sequence downlink microframes and a consecutive sequence of uplink microframes. The programming also includes instructions for transmitting a packet to the wireless device in one downlink microframe of the consecutive sequence of downlink microframes. The programming also includes instructions for receiving an acknowledgement of the packet in an uplink microframe, wherein the uplink microframe is determined in accordance with the one downlink microframe and the uplink-downlink configuration.

One aspect of overhead is dynamic frame configuration switching. In Release 12 specifications of LTE (Rel-12), there are features that allow the uplink-downlink configuration for time division duplexing (TDD) mode (frame structure type 2) to change every 10 ms. Before the introduction of dynamic switching of the uplink-downlink configuration (e.g., enhanced interference management and traffic adaptation (eIMTA)), the configuration was chosen from one option in Table 1 (from Table 4.2-2 of 3GPP 36.211).

TABLE 1

Uplink-downlink configuration

| Uplink-downlink configuration | 0 | 1 | 2 | 3 | 4 | 5 | 6 | 7 | 8 | 9 |
|---|---|---|---|---|---|---|---|---|---|---|
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, "D" represents a downlink (DL) subframe, "U" represents an uplink (UL) subframe, and "S" represents a special subframe. In LTE, a subframe is defined as 30,720 samples where the sample rate (1/Ts) is 30,720,000 samples/sec. In the special subframe, the samples are grouped into three sets. The first set of samples forms the downlink pilot timeslot (DwPTS), the second set of samples forms the guard period (G), and the last set forms the uplink pilot timeslot (UpPTS). The number of samples in each set is defined by the standards. The guard period allows the device to switch from receiving downlink transmissions to transmitting uplink transmissions as well as allowing timing advance.

With eIMTA, one or more capable UEs would monitor downlink control indicator (DCI) format 1C to determine the uplink-downlink configuration for the next radio frame (one radio frame is 10 subframes, where the subframes are numbered 0 to 9). DCI format 1C is transmitted on the physical downlink control channel (PDCCH) using the common search space rules. There are certain uplink-downlink configurations could be grouped together, such as ((4, 0, 1, 3, 6), (5, 0, 1, 2, 3, 6), (2, 0, 1, 6)).

Among the considerations in the grouping for eIMTA is how the acknowledgements and negative acknowledgements (ACK/NACK or A/N) for the reception of packets are transmitted. In general, certain acknowledgements and negative acknowledgements indicators for hybrid automatic repeat request (HARM) processes are transmitted as HARQ-ACK bits in the uplink control information (UCI) sent on the physical uplink control channel (PUCCH). For example, a UE receiving a downlink transmission in subframe n would sent HARQ-ACK bits on an uplink subframe. For frequency division duplexing (FDD), the HARQ-ACK bits are transmitted in subframe n+4 (if the sum is less than 10, subframe n+4 in the current frame is used, otherwise subframe n+4−10 in the next frame is used). For TDD, the transmission of HARQ-ACK bits is a function of subframe number and the uplink-downlink configuration and is at least 4 subframes later. For eIMTA, a different function based on the current subframe number, the future uplink-downlink configuration, and current uplink-downlink configuration may be needed.

In the enhanced wide bandwidth LTE system, a desired feature is to enable low latency. Embodiments described below provide a microframe structure to enable low latency.

FIG. 1 is a diagram illustrating an embodiment subframe system 100. Each subframe 101 is divided into several microframes 102, as shown in FIG. 1. In this example, there are 8 microframes 102 (labeled 0, 1, 2, . . . , 7) in one subframe. In an embodiment, the duration of each microframe 102 is 125 microseconds (µs). The microframe 102 can be configured for either uplink or downlink transmission. For TDD, a special microframe may be defined and capable of supporting uplink and downlink transmissions. Another type of a special microframe has a downlink portion and guard period. There can be a PDCCH or enhanced PDCCH (EPDCCH) in each downlink microframe and special microframe for TDD. Each microframe 102 contains one or more orthogonal frequency division multiplex (OFDM) symbols 103. In the frequency domain, each OFDM symbol 103 includes resource elements (subcarriers). The subcarrier spacing (frequency separation between adjacent subcarriers) can be 60 kHz. In the time domain, each OFDM symbol 103 has a cyclic prefix (CP) field 104 with $n_{CP}$ samples. Each symbol 103 of the microframe 102 can have a different value for $n_{CP}$. In many realizations, the OFDM symbol 103 in the time domain can be generated by performing an inverse fast Fourier transform (IFFT) on the subcarriers. The last $n_{CP}$ samples of the IFFT output 105 can be used for the cyclic prefix.

Note that with Rel-12 LTE, a subframe 101 is divided into two 0.5 ms slots. One difference between a microframe 102 and a slot is the location of the control channel. With slots, the PDCCH is located on slot 0 and the EPDCCH spans both slots of the subframe.

Also note that in some embodiment of the disclosed systems and methods, the subframe duration and radio frame are untouched. In an embodiment, the subframe duration is 1 ms, 10 subframes make up a radioframe, etc.

Figure 2:
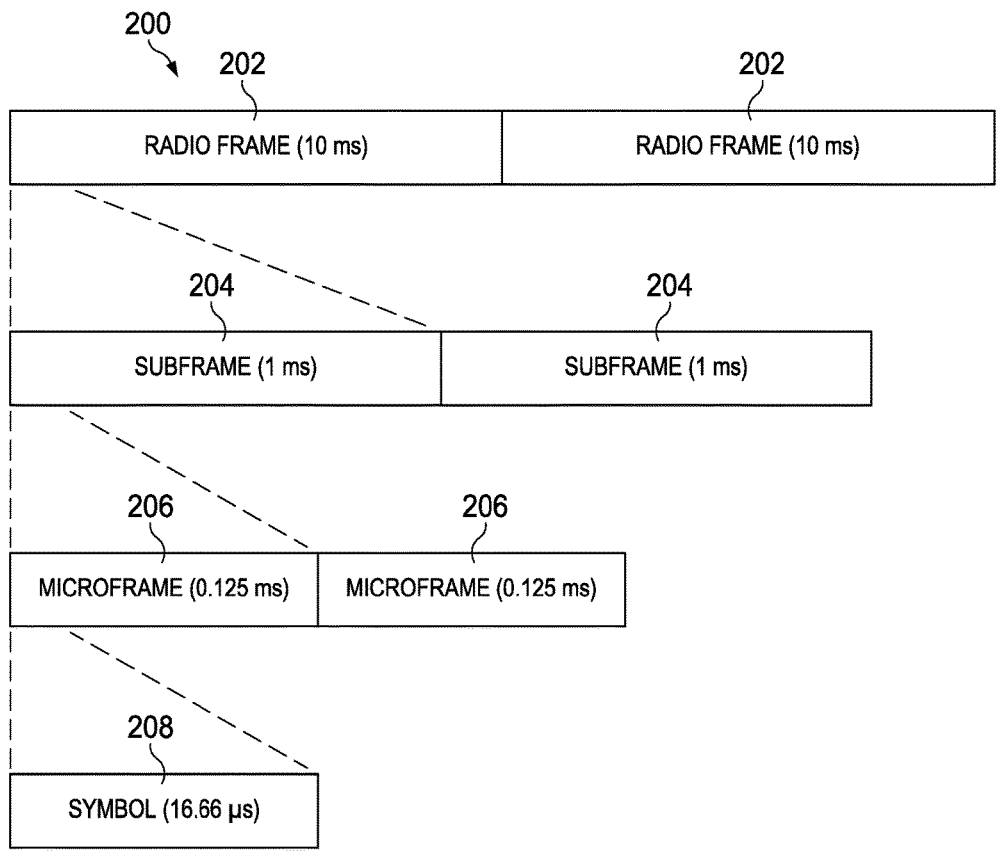
FIG. 2 illustrates an embodiment of a microframe fitting in the LTE numerology.

FIG. 2 is a diagram illustrating an embodiment of the radioframe/subframe/microframe division 200. In an embodiment, each radio frame is about 10 milliseconds (ms) in duration. Each radio frame 202 includes ten subframes 204 of 1 ms each. Each subframe 204 includes eight microframes 206 of 0.125 ms each. Each microframe 206 includes a plurality of symbols 208 where each symbol is about 16.66 µs.

An embodiment numerology is given as an example in Table 2, where 1/Ts' is 16×(1/Ts) with 1/Ts=30,720,000 samples/sec.

TABLE 2

Example of numerology.

| Unit | Duration | Relationship | Number of Ts' samples |
| --- | --- | --- | --- |
| Frame | 10 ms | | 4915200 |
| Subframe | 1 ms | 10 subframes/frame | 491520 |
| Microframe | 0.125 ms | 8 microframes/subframe | 61440 |
| Symbol (no CP) | 16.66 µs | | 8192 |

With respect to the cyclic prefix, with a 60 kHz subcarrier spacing, the number of tones (subcarriers) in one OFDM symbol is 1/Ts'/60,000=8192. The number of samples in a 1 ms subframe is 1/Ts'/1000=491520 (60 OFDM symbols). To determine the number of symbols in a microframe and the amount of overhead, one possible procedure is to evaluate an equation $$N_{sym}^{SF} = N_{sym}^{CP} + N_{sym}^{mf} N_{mf} \quad (1)$$

where $N_{sym}^{SF}=60$ is the number of OFDM symbols in a subframe (SF), $N_{sym}^{CP}$ is the number of OFDM symbols that will be reserved for overhead (cyclic prefix (CP)), $N_{sym}^{mf}$ is the number of symbols in a microframe, and $N_{mf}$ is the number of microframes in a subframe. The samples of the overhead symbols will be distributed among the $N_{sym}^{mf} N_{mf}$ symbols, thereby providing those symbols with a cyclic prefix. From a design perspective, the value of $N_{sym}^{CP}$ can be used to determine cell coverage and possible deployments, the value of $N_{sym}^{mf}$ can be used to determine the amount of data that can be conveyed in a microframe, and the value of $N_{mf}$ can be used to determine latency.

The average CP duration in terms of time is $$\tau_{sym} N_{sym}^{CP}/(N_{mf} N_{sym}^{mf}), \quad (2)$$

where $\tau_{sym}$ is the duration of one OFDM symbol (16.64 µs). The actual CP duration may deviate from the average CP duration due to using an integer number of samples per symbol.

Three possible microframe configurations that satisfy (1) are listed in Table 3.

TABLE 3

Microframe configurations

| Mode | $N_{sym}^{CP}$ | $N_{sym}^{mf}$ | $N_{mf}$ | Average CP duration, µs |
| --- | --- | --- | --- | --- |
| 1 | 4 | 7 | 8 | 1.19 |
| 2 | 12 | 6 | 8 | 4.16 |
| 3 | 20 | 5 | 8 | 8.33 |

As indicated by Table 3, mode 1 has 7 ODFM symbols/microframe and 8 microframes per subframe.

To determine the actual number of samples allocated to the CP for each symbol of the microframe, one possible procedure is to solve $$(N_{sym}^{CP}/N_{mf})N_{samp}^{sym} = (N_{sym}^{mf} - x)aQ + x(a+1)Q \quad (3)$$

where $N_{samp}^{sym}$ is the number of samples in an OFDM symbol (8192), a is an integer to be determined, Q is a granularity (such as 32) such that $aQ\tau_{sym} \leq \tau_{sym} N_{sym}^{CP}/(N_{sym}^{mf} N_{mf}) \leq (a+1)Q\tau_{sym}$, and x is the number of microframes with a larger CP (i.e., (a+1)Q) and $N_{sym}^{mf}-x$ is the number of microframes with a shorter CP (i.e., aQ).

TABLE 4

Example of CP allocation. Q = 32, sample duration = Ts'

| Mode | #microframe, shorter CP | Shorter CP, #samples (aQ) | #microframe, longer CP | Longer CP, #samples ((a + 1)Q) |
| --- | --- | --- | --- | --- |
| 1 | 5 | 576 | 2 | 608 |
| 2 | 6 | 2048 | | |
| 3 | 5 | 4096 | | |

Table 4 indicates that in mode 1, there are 7 symbols in a microframe. 5 symbols will have a CP of 576 samples (1/Ts') while 2 symbols will have a CP of 608 samples. The average CP duration is 1.19 µs. There can be $$\frac{N_{sym}^{mf}!}{(N_{sym}^{mf} - x)! \, x!}$$

possible symbol arrangements, where $N_{sym}^{mf}=7$ is the number of symbols in a microframe, and x=2 is the number of symbols with a longer CP. One example of an arrangement is having the first and last symbols of the microframe use a longer CP. The choice of an arrangement can be made based on performance.

The general microframe structure described above can be applied to FDD.

Figure 3:
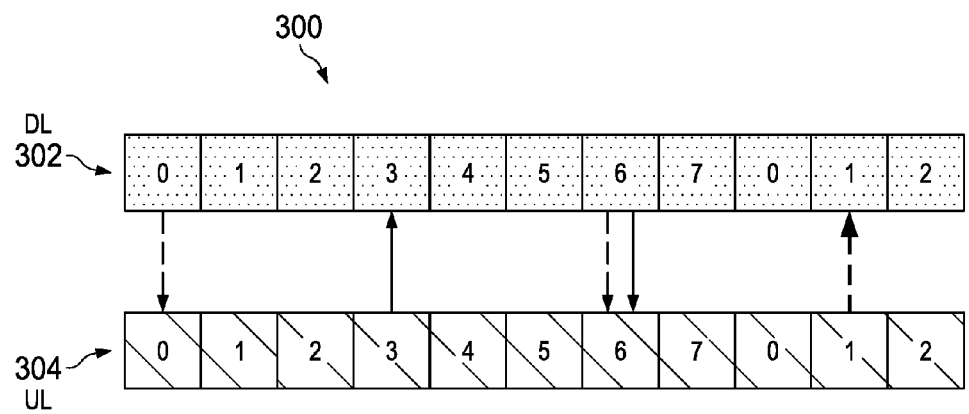
FIG. 3 illustrates an embodiment of microframes for FDD.

FIG. 3 is a diagram illustrating an embodiment of the disclosed microframe structure 300 as applied to FDD, showing downlink microframes 302 and uplink microframes 304. An example of an n+3 rule is used for data transmission on both the uplink and downlink. For the transmission of data on the uplink in microframe 3 (solid line) by the UE, the eNB transmits an uplink grant (DCI) in microframe 0 (dashed line). For downlink data transmission, the eNB transmits a downlink assignment (DCI) as well as data in microframe 6. In microframe 1 (microframe n+3), the UE transmits the acknowledgement bits.

Figure 4:
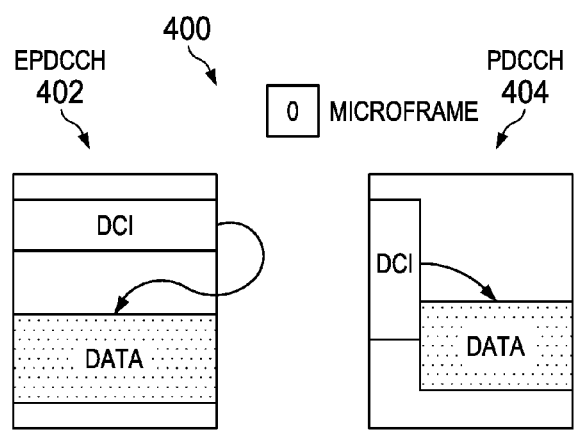
FIG. 4 illustrates an embodiment of DL scheduling.

FIG. 4 illustrates an embodiment of DL scheduling 400. With respect to DL scheduling 400, FIG. 4 shows an example of EPDCCH 402 for signaling of data in the same microframe and PDCCH 404 (occupying the first symbols of downlink (special) microframe, such as microframe 0) with respect to DL scheduling. The EPDCCH could span the DL microframe (or downlink portion of a special microframe). The (E)PDCCH can be used to schedule uplink grants for data and possibly other operations that may require uplink transmissions (e.g., measurement reporting).

With respect to TDD, in an embodiment, the microframe structure allows dynamic uplink-downlink configuration without having complicated rules for configurations or complicated rules for transmitting HARQ-ACK bits while ensuring low latency. The following discussion describes several such approaches.

For signaling, to support a dynamic uplink-downlink configuration, the subframe can be partitioned into a set of consecutive downlink microframes followed by a set of consecutive uplink microframes. There may be a special microframe between the downlink microframe and uplink microframe. If $N_{mf}$ denotes the number of microframes in a subframe (e.g., 8), $N_{mf}^{DL}$ denotes the number of downlink microframes, and $N_{mf}^{SP}$ is the number of special microframes in a subframe, then the number of uplink microframes in a subframe, $N_{mf}^{UL}$, can be expressed as $N_{mf}^{UL}=N_{mf}-N_{mf}^{DL}-N_{mf}^{SP}$. As a result, when the number of microframes in a subframe is known (e.g., standardized or signaled through other physical layer means or by higher layer messaging), only the number of downlink microframes in a subframe needs to be signaled. The number of special microframes is typically 1. More specifically, in an embodiment, the subframe configuration is as follows:

Microframes #0, . . . , $N_{mf}^{DL}-1$ are configured as downlink microframes,

Microframes #$N_{mf}^{DL}+N_{mf}^{SP}$, . . . , $N_{mf}-1$ are configured as uplink microframes, and Microframe $N_{mf}^{DL}$, . . . , $N_{mf}^{DL}+N_{mf}^{SP}-1$ may be designated as the special microframe.

In an embodiment, one possible requirement is having at least one uplink microframe and at least one downlink/special microframe in a subframe, i.e., $N_{mf}^{UL}>0$ and $N_{mf}^{DL}+N_{mf}^{SP}>0$.

Figure 5:
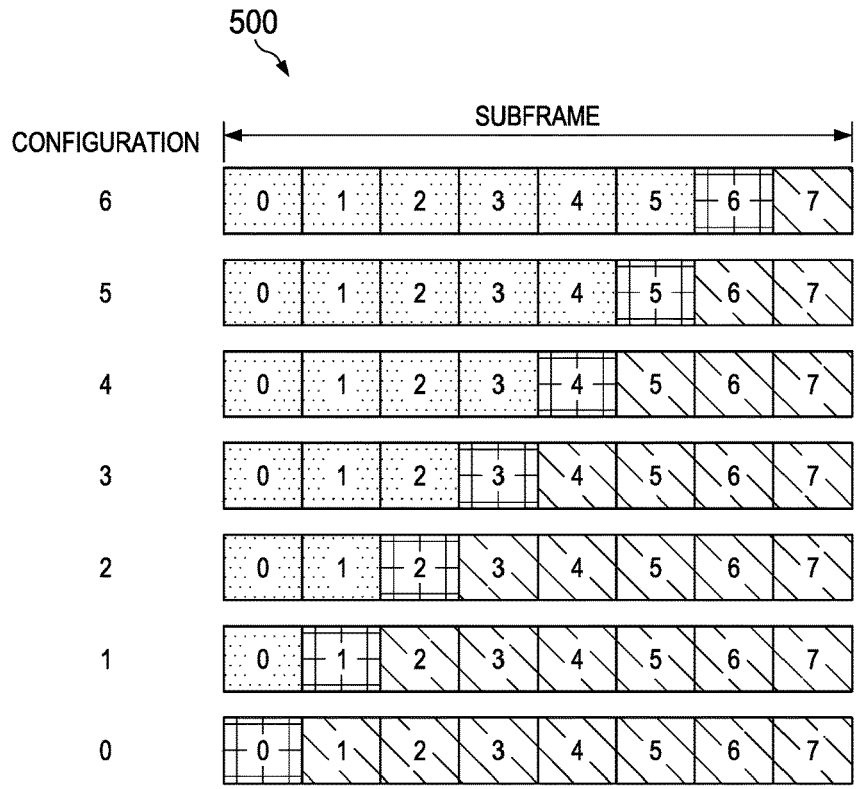
FIG. 5 illustrates embodiments of uplink-downlink configurations.

FIG. 5 illustrates embodiments of uplink-downlink configurations 500. FIG. 5 shows 7 possible uplink-downlink configurations 500. Throughout this disclosure, a dotted box indicates a downlink microframe (e.g., microframe 0 in configuration 6 in FIG. 5), a cross-hatched box indicates a special microframe (e.g., microframe 0 in configuration 9 in FIG. 5), and a diagonal striped box indicates an uplink microframe (e.g., microframe 1 in configuration 0 of FIG. 5). The special microframe may have a guard period to facilitate Rx/Tx switching. As a result, the special microframe can have fewer data-bearing symbols (hence lower data rate). The special microframe precedes the first uplink microframe in a group of consecutive uplink microframes. Note a similar mapping can be based on the number of uplink microframes. Note that with these set of configurations, microframe #0 is DL or special, and microframe #7 is UL. With the partitioned subframe (consecutive downlink microframes followed by a special microframe followed by consecutive uplink microframes), the uplink-downlink configuration can also indicate the number of downlink microframes of each subframe or the location of the special microframe for each subframe.

The microframe configuration needs to be signaled to the UE. There are several possible ways of signaling. First, if the uplink-downlink configuration does not change very often, it could be communicated by radio resource configuration (RRC) signaling, either dedicated (UE-specific) or common (broadcast). In the extreme case, the uplink-downlink configuration could be signaled using the master information block (MIB) transmitted in the physical broadcast channel (PBCH).

Second, a channel similar to the physical control format indicator channel (PCFICH) can be used to indicate the uplink-downlink configuration. This similar channel could be sent on reserved resources on dedicated microframes (e.g., microframe #0 of the subframe, microframe #0 of subframe #0, etc.). In this example, the signaling can be sent every 1 ms. A slower rate can be used.

Third, the signaling could be done by using sequences.

Fourth, the signaling could also be done by using a special DCI.

With respect to sequence signaling, in microframe 0, there can be a set of waveforms transmitted by the eNB that indicate the uplink-downlink configuration. One example is to select a waveform from a set of waveforms indexed by the uplink-downlink configuration Table 5 shows an example of a mapping between the configuration and bit pattern.

TABLE 5

Bit sequence indicating uplink-downlink configuration

| Uplink-downlink configuration | Bit pattern |
| --- | --- |
| 0 | 0000 0000 0000 0000 0000 0000 0000 0000 |
| 1 | 1100 1100 1100 1100 1100 1100 1100 1100 |
| 2 | 0011 0011 0011 0011 0011 0011 0011 0011 |
| 3 | 1001 1001 1001 1001 1001 1001 0101 0101 |
| 4 | 1010 1010 1010 1010 1010 1010 1010 1010 |
| 5 | 0101 0101 0101 0101 0101 0101 0101 0101 |
| 6 | 0110 0110 0110 0110 0110 0110 0110 0110 |
| 7 | 1111 1111 1111 1111 1111 1111 1111 1111 |

Once a bit pattern is selected based on the uplink-downlink configuration, it can be mapped into a sequence of quadrature phase shift key (QPSK) points, such as 00→exp(jπ/4), 01→exp(-jπ/4), 10→exp(j3π/4), 11→exp(-j3π/4), where j=sqrt(-1). Let $\varphi_i$ denote the sequence associated with uplink-downlink configuration i, i=0, . . . , 6. The bit pattern can be chosen so that the sequences $\varphi_i$ have good cross-correlation properties, such as $$\varphi_i^* \varphi_k = \begin{cases} N, & i = k \\ 0, & i \neq k \end{cases}, \quad (4)$$

where "*" denotes Hermitian transpose, and N is the length of the sequence $\varphi_i$. This sequence can be transmitted in microframe 0 (the first microframe of each subframe).

Figure 6:
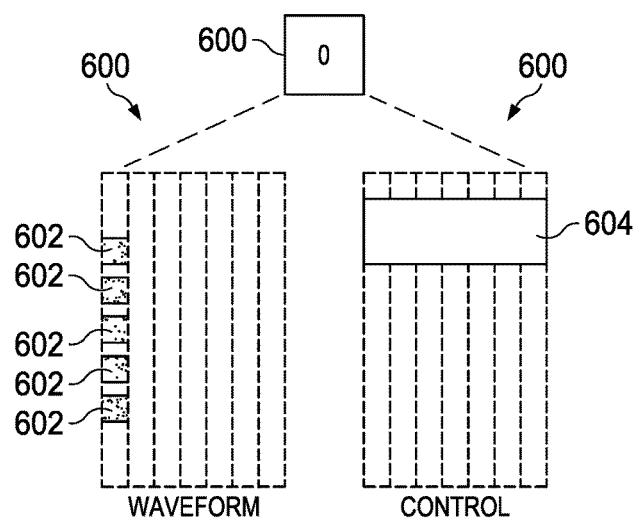
FIG. 6 illustrates an embodiment of signaling of uplink-downlink configuration.

FIG. 6 (waveform) shows the location of the sequence in the frequency domain in an embodiment. In this example, the waveform 602 is located on non-adjacent subcarriers of the first OFDM symbol of microframe 0 600. In general, the waveform 602 can be located on any of the OFDM symbols of a microframe. In general, the subcarriers can be non-adjacent, adjacent or groups of adjacent subcarriers. Note also that the sequence can be used to color another signal, such as Reference Signal (RS).

With respect to signaling using a special DCI format, an embodiment uses a DCI that all UEs can process. The uplink-downlink configuration is conveyed by that DCI.

FIG. 6 (control) also shows an example of the DCI 604 placed (logically) in an EPDCCH that spans the symbols of microframe 0 600 in an embodiment. This DCI 604 can be placed in a common search space.

Note that for TDD system operations, the network needs to synchronize at the microframe level to avoid strong UL/DL interference from neighboring cells. If a dynamic microframe configuration is deployed, the network may need very short delay backhaul to communicate dynamic microframe configuration at the subframe level.

Another type of DCI (or field within a DCI) that can augment operation is a probe DCI. For brevity, the term "probe field" is used. One purpose is to signal a UE when to receive scheduling DCIs. In one application, the probe field is transmitted in microframe 0 when it is configured as a downlink or special microframe. In one example, the size of the probe field is related to the number of microframes in a subframe. With 8 microframes in a subframe, the bit field can be 7 bits. Because a UE is receiving this field, a bit is not needed. In example A in Table 6, the field "0101000" can indicate to a UE to expect DCIs in microframes 2 and 4

(indicated by "1") in the field. The bit position in the field is related to the microframe number. The most significant bit can map to microframe 1. On the microframes where the UE is no "1" assigned, the UE may decide not to receive DCI (as a possible power savings feature).

In example B in Table 6, the field "1000100" can indicate to a UE to expect DCI in microframe 1. When coupled with the uplink-downlink configuration, the bits that are allocated for uplink microframes can be used to indicate when HARQ-ACK bits are transmitted. Typically there are rules, such as described below with respect to DL HARQ, when a UE transmits the HARQ-ACK bits but this may complement those rules. In this example, microframe 5 is used by the UE to transmit the HARQ-ACK bits for a received packet in microframe 1.

TABLE 6

Probe field example (columns "1", ..., "7" indicate microframe number)

| Example | 1 | 2 | 3 | 4 | 5 | 6 | 7 | Description |
|---|---|---|---|---|---|---|---|---|
| A | 0 | 1 | 0 | 1 | 0 | 0 | 0 | Expect DCI in microframes 2 and 4 (indicated by 1) |
| B | 1 | 0 | 0 | 0 | 1 | 0 | 0 | Expect DCI in microframe 1. Transmit A/N in microframe 5 |

There may be a DCI which packs the probe fields together (consider an array of p fields each with a size P=7 bits. A UE may be assigned an index $i \in \{0, \ldots, p-1\}$ during a configuration. The UE examines bits iP to (i+1)P−1 for its probe field. Multiple UEs may be assigned the same index.

For a TDD deployment, the transitions between downlink and uplink as well as uplink and downlink need a guard time s in order to allow the hardware to switch functionalities. With respect to a special microframe, in LTE Rel-12, the special subframe has a guard period that incorporates the switch times and adds a margin of time for timing advance. A UE uses timing advance to adjust its transmit timing. Typically, the amount of timing advance is proportional to the distance between the eNB and UE. For line-of-sight communications, an estimate of timing advance is 2 d/c, where d is the distance and c is the speed of light.

The amount of guard period can be expressed as 2 s+2 d/c.

TABLE 7

| | Guard periods | | | | |
|---|---|---|---|---|---|
| | | | d | | |
| s | 100 m | 200 m | 500 m | 1000 m | 2000 m |
| 10 µs | 20.7 | 21.3 | 23.3 | 26.7 | 33.3 |
| 12 µs | 24.7 | 25.3 | 27.3 | 30.7 | 37.3 |
| 14 µs | 28.7 | 29.3 | 31.3 | 34.7 | 41.3 |
| 16 µs | 32.7 | 33.3 | 35.3 | 38.7 | 45.3 |

One design option is to select the duration of the guard period as a multiple of the OFDM symbol and cyclic prefix. For example, for mode 1, a CP of 576 samples is about 1.17 µs. Thus one OFDM symbol with this CP is 17.84 µs. Multiples (in vs) include 35.68, 53.52, 71.36. One possible choice for s is 14 µs and d is 1000 m. If a smaller switch time is allowed, then the distance can increase.

Each mode can select the appropriate number of symbols to use to account for a larger coverage area.

Figure 7:
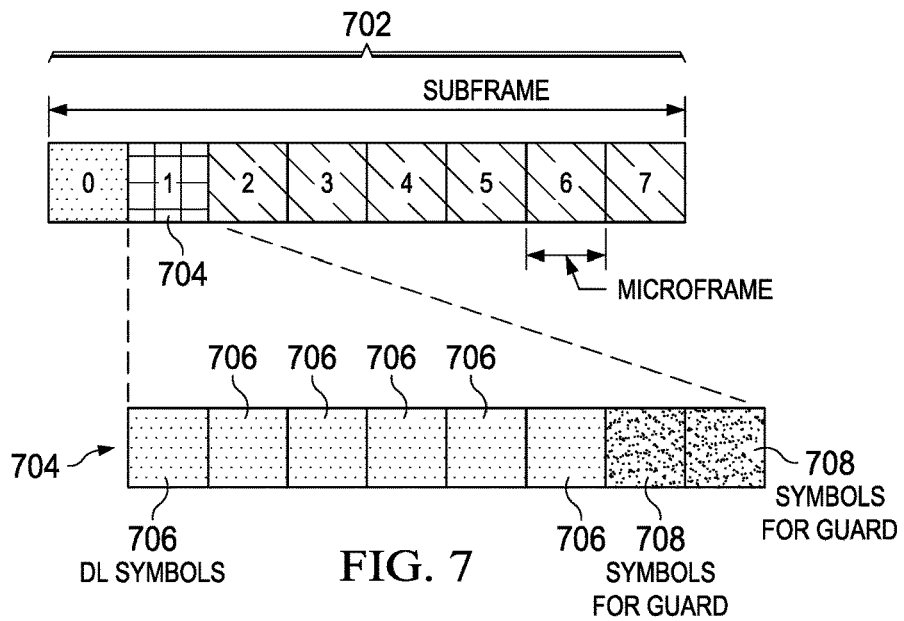
FIG. 7 illustrates an embodiment of a guard period in a special microframe.

FIG. 7 illustrates one embodiment of a special microframe 704 for uplink-downlink configuration 1 (defined in FIG. 5) and mode 1. Each subframe 702 includes eight microframes labeled 0, 1, 2, . . . , 7. The microframe labeled "1" is a special microframe 704. In the special microframe 704, the first 5 symbols 706 (dotted) are configured for DL. The last two symbols 708 (solid) are for the guard. In the subframe 702, a dotted microframe is a DL microframe, a diagonal hashed microframe is a UL microframe, and horizontal/vertical lines in a microframe indicates a special microframe 704. The eNB may signal the special microframe configuration.

Figure 8:
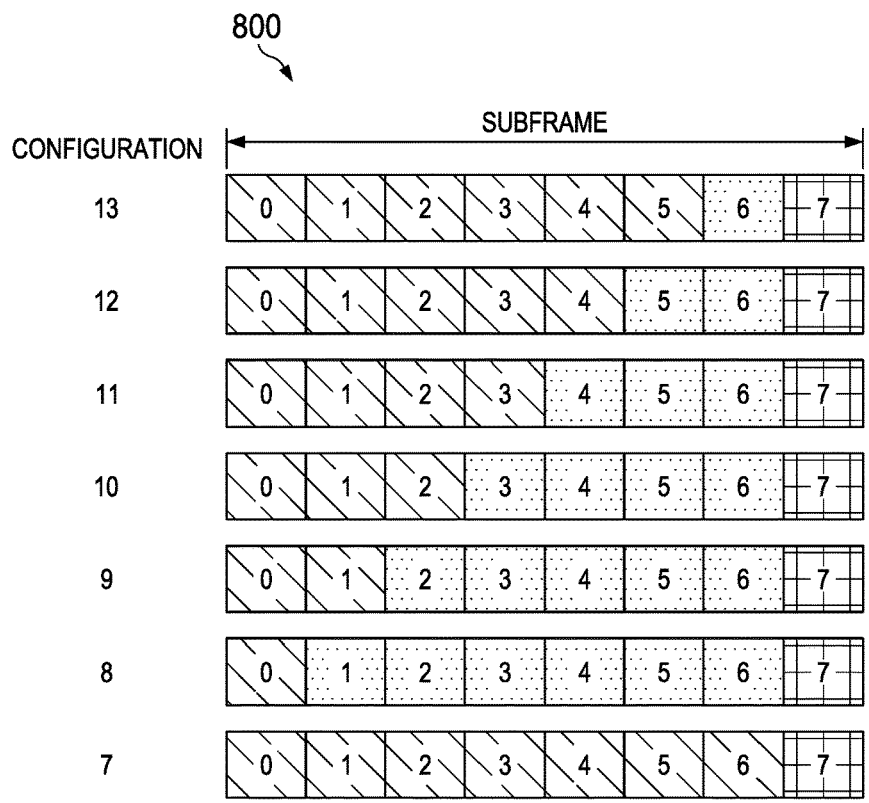
FIG. 8 illustrates embodiments of possible uplink-downlink configurations.

FIG. 8 illustrates embodiments of possible uplink-downlink configurations 800. The configurations 800 are labeled 13, 12, 11, . . . , 7. With respect to a supermicroframe pattern, the subframe can be partitioned into a set of uplink microframes followed by a set of downlink microframes as illustrated in FIG. 8, where possible uplink-downlink configurations with a dotted box indicating a downlink microframe, a cross-hatched box indicating a special microframe, and the diagonal striped box indicating an uplink microframe. The special microframe may have a guard period to facilitate Rx/Tx switching. As a result, the special microframe can have data-bearing fewer symbols (hence lower data rate). The special microframe precedes the first uplink microframe in a group of consecutive uplink microframes. The special microframe in uplink-downlink configurations 7-13 may be optional in a subframe when the next subframe uses uplink-downlink configurations 0-6. Note that a different special microframe with guard followed by data-bearing symbols (for the DL) can be defined. With this different special microframe, the first microframe after the last uplink microframe could be this special microframe.

A supermicroframe pattern includes multiple subframes, where the first subframe includes one of the configuration 0-7, and the subsequent subframes include any of the configurations 0-13.

Figure 9:
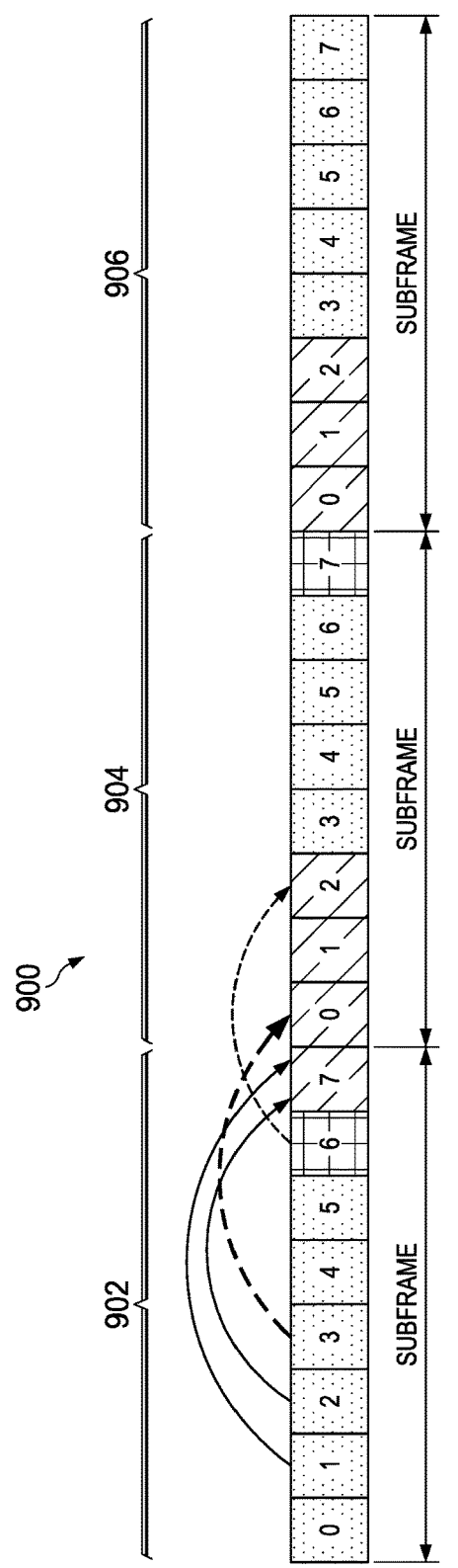
FIG. 9 illustrates a embodiment of a supermicroframe configuration.

FIG. 9 illustrates a embodiment of a supermicroframe configuration 900, where a super microframe structure 900 consists of 3 subframes 902, 904, 906. In an embodiment, a supermicroframe 900 may be used to reduce latency due to delays in HARQ-ACK bit transmissions. FIG. 9 illustrates an example where the HARQ-ACK bits of 2 microframes are bundled. It is assumed that HARQ-ACK bundling is not used for the special microframe. The first microframe of subframe 1 is an UL microframe, and the HARQ-ACK feedback for microframes 3 and 4 of subframe 0 can be sent in that microframe, hence reducing latency.

With respect to UL scheduling, scheduling traffic on the uplink implies the eNB sends DCIs for uplink grants on the downlink/special portions of the subframe.

Figure 10:
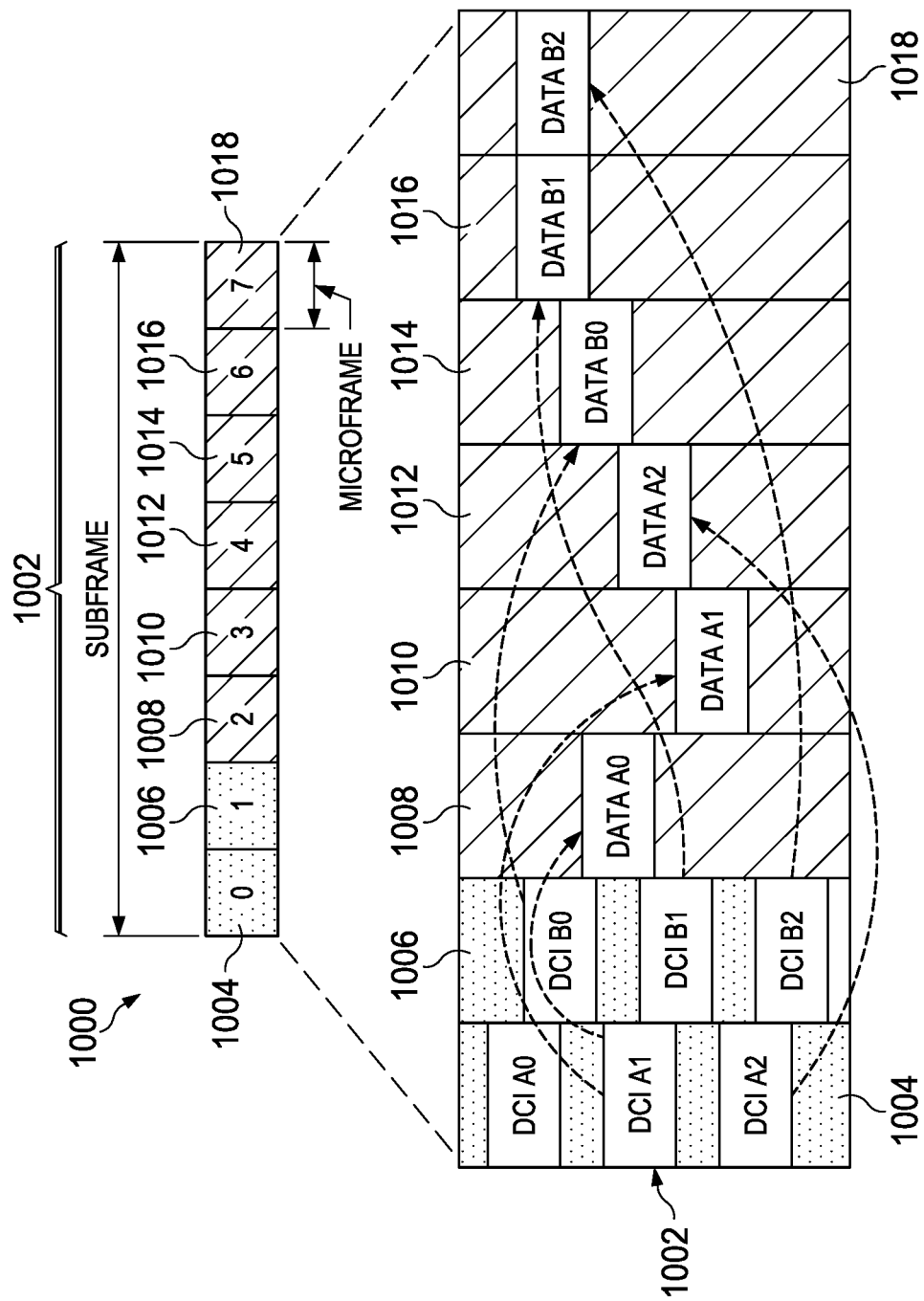
FIG. 10 illustrates a first embodiment of UL scheduling.

FIG. 10 illustrates a first embodiment of UL scheduling 1000. In the example shown in FIG. 10, the subframe 1002 in configuration 1 has two downlink microframes 1004, 1006 (labeled "0" and "1") and 6 uplink microframes 1008, 1010, 1012, 1014, 1016, 1018 (labeled "2", "3", "4", "5", "6", and "7"). When the special microframe has only downlink and guard, it can be considered as a downlink microframe. In microframe 0 1004, there are 3 uplink grants, DCI A0, DCI A1, and DCI A2, for data A0 in microframe 2 1008, data A1 in microframe 3 1010, and data A2 in microframe 4 1012, respectively. Likewise in microframe 1 1006, there are 3 uplink grants, DCI B0, DCI B1, and DCI B2, for data B0 in microframe 5 1014, data B1 in microframe 6 1016, and data B2 in microframe 7 1018, respectively. In an embodiment, there is a minimum 2 microframe delay between the transmission of the grant and the transmission of the data. A minimum rule such as n+2 can be used, allowing a UE to prepare for data transmission after receiving a grant.

Figure 11:
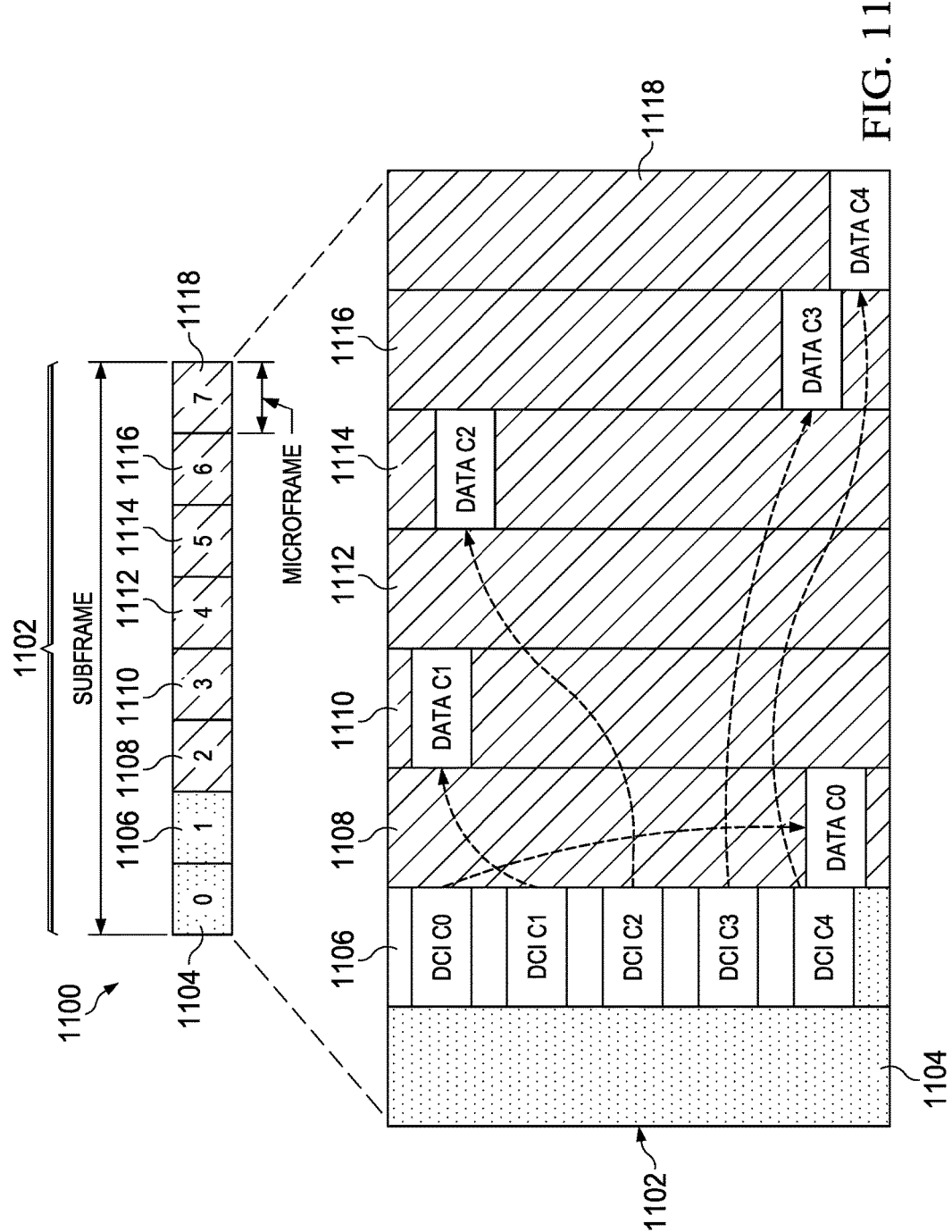
FIG. 11 illustrates a second embodiment of UL scheduling.

FIG. 11 illustrates a second embodiment of UL scheduling 1100. In the example shown in FIG. 11, configuration 1 is used again. The subframe 1102 includes eight microframes 1104, 1106, 1108, 1110, 1112, 1114, 1116, 1118 (labeled "0", "1", "2", "3", "4", "5", "6", and "7"). In microframe 1 1106, there are 5 uplink grants, DCI C0, DCI C1, DCI C2, DCI C3, and DCI C4, for data C0 in microframe 2, data C1 in microframe 3 1110, data C2 in microframe 5 1114, data C3 in microframe 6 1116, and data C4 in microframe 7 1118, respectively. In this example, the last downlink microframe 1106 is used for scheduling uplink traffic. In an embodiment, all grants are sent in this last DL microframe 1106. In an embodiment, the scheduling of DCI C0 in DL1 for UL2 assumes the UE can implement an n+1 rule for uplink traffic. It may be possible given that there is some guard period (DL1 is a special microframe). Typically, an n+2 rule may be preferred.

Figure 12:
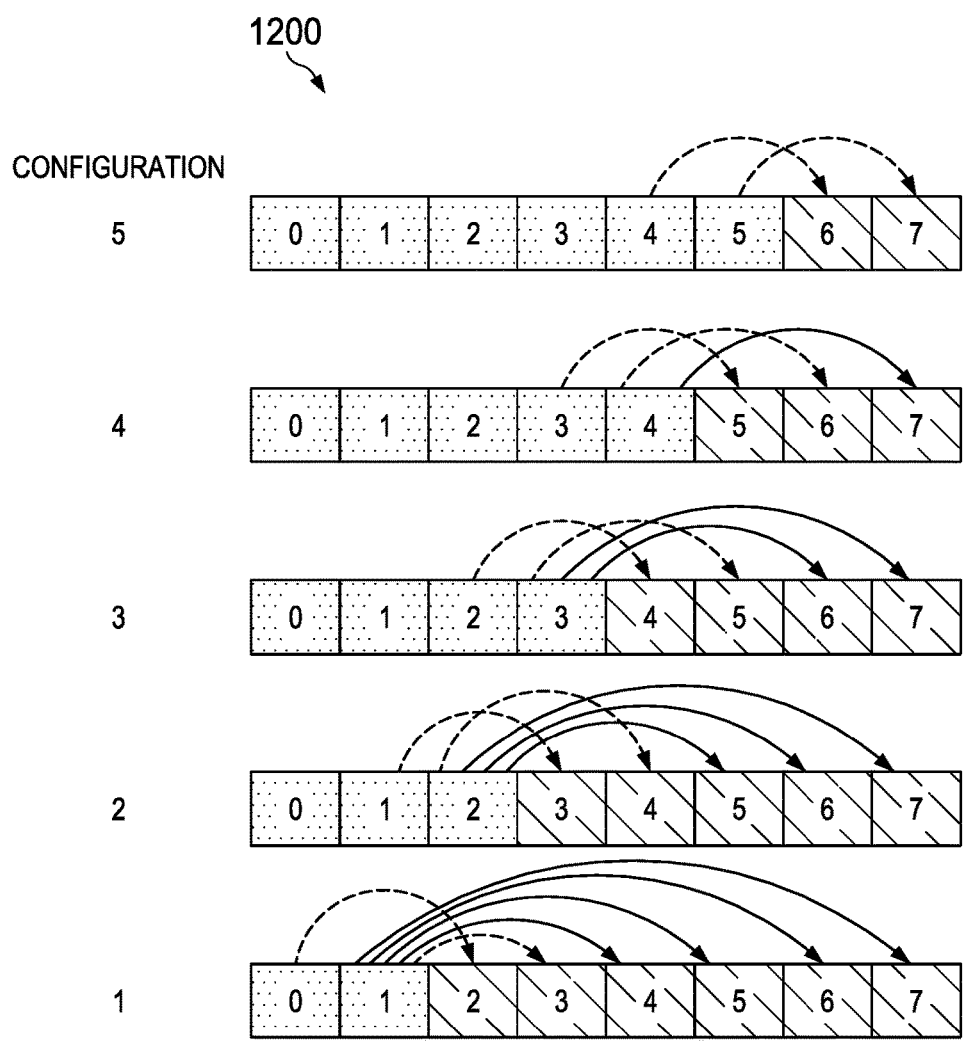
FIG. 12 illustrates a third embodiment of UL scheduling.

FIG. 12 illustrates a third embodiment of UL scheduling 1200. Five configurations are illustrated in FIG. 12. Thus, another example for scheduling may allow uplink-downlink configurations with at least two uplink microframes and at least two downlink microframes (one microframe is designated as a special microframe), as shown in FIG. 12. Then a rule, such as minimum of 2 microframes, can be used and the last downlink microframe is used to schedule uplink microframes that are more than 2 microframes later (see configuration 4 where DL microframe 4 is used to schedule DL microframes 6 and 7, for example).

The following provides embodiments of DCI formats that may be needed to support this signaling.

A simple way to accommodate the signaling needed for signaling such configurations is to always include 3 bits indicating to which microframe index the DCI applies. The index applies either to the current subframe or to the next microframe. However, there are possible optimizations.

Case 1, more DL microframes than UL microframes: in such a case, there is no ambiguity for the UL signaling. The UL signaling is valid for the UL microframe after a fixed number of microframes (e.g., 2 or 4). This is what is done for LTE.

Case 2, more UL microframes than DL microframes: in such a case, multi-microframe scheduling is needed to be able to address all UL microframes. This can be done by adding the microframe index for which the addressing is valid (added in this case only).

Case 3, special UL assignment: latency reduction is one of the primary goals for WB-LTE. It might then be worth to assign the UL on a particular microframe, for instance the last microframe of the subframe. In such a case, one bit could be added. If this bit is set to a particular value (or toggled), the DCI assignment follows the e.g., n+2 rule. If it has the other value, the DCI is for a pre-determined microframe (or configured by e.g., RRC signaling).

The HARQ timing, which incorporates data transmissions, acknowledgment transmission, and re-transmission, is determined to ensure low latency. In Rel-12, the general rule for FDD is if a packet were transmitted in subframe n, the acknowledgment is transmitted in subframe n+4, and the data can be re-transmitted in subframe n+8. The general rules for TDD are more complex where the acknowledgement and retransmission are sent in subframe n+k and subframe n+k+1, respectively, where k≥4 and l≥4, and the values of k and l are a function of the subframe number n and uplink-downlink configuration.

For DL HARQ and microframe structures, an example of an n+2 rule is shown in Table 8. The goal is for a UE to send its HARQ-ACK bits for a packet in the second microframe after receiving the packet. Due to the partitioned subframe structure, for some uplink-downlink configurations, there are some exceptions for the n+2 rule. For example, uplink-downlink configuration 6, the HARQ-ACK bits for a packet received in microframe 6 will be in the next subframe (as indicated by the "*" in the table). Details on when a UE can send the HARQ-ACK bits in this example are presented below with respect to the n+2 rule, restricted uplink-downlink configurations.

For certain uplink-downlink configurations (#4, #5, #6), techniques such as bundling and multiplexing may be needed (described with respect to the n+2 rule, restricted uplink-downlink configurations). With the n+2 rule, the earliest HARQ-ACK bits can be transmitted by the UE for packets in downlink microframes 0, 1, 2, 3 is microframe 5. HARQ-ACK bits for microframe 4 can be transmitted in microframe 6. What is presented in the table is HARQ-ACK bits for microframes 0 and 1 are sent in microframe 5; HARQ-ACK bits for microframes 2 and 3 are sent in microframe 6; and HARQ-ACK bits for microframe 4 is sent in microframe 7. One reason is to distribute uplink transmissions across all uplink microframes to improve error rate performance.

TABLE 8

Example of HARQ-ACK transmission timing for an n + 2 rule

| Configuration | 0 | 1 | 2 | 3 | 4 | 5 | 6 |
|---|---|---|---|---|---|---|---|
| 0 | UL 2 | — | — | — | — | — | — |
| 1 | UL 2 | UL 3 | — | — | — | — | — |
| 2 | UL 3 | UL 4 | UL 5 | — | — | — | — |
| 3 | UL 4 | UL 5 | UL 6 | UL 6 | — | — | — |
| 4 | UL 5 | UL 5 | UL 6 | UL 6 | UL 6 | — | — |
| 5 | UL 6 | UL 6 | UL 6 | UL 7 | UL 7 | UL 7 | — |
| 6 | UL 7 | UL 7 | UL 7 | UL 7 | UL 7 | UL 7 | * |

A baseline rule for HARQ-ACK transmission is shown using python code where delta=2 (the "2" in n+2 rule), cfg is uplink-downlink configuration, maxum is the number of microframes in a subframe, and d1 is the microframe of data transmission. This routine can provide an initial configuration after which improvements for reducing latency, bundling/multiplexing, and performance can be added. In an embodiment, the following code can be used for n+3, n+4, etc. by changing delta appropriately.

```
def check_(computed, maxum):
    flag = 2*maxum
    if computed < maxum:
        return computed
    return flag
def generate(delta, cfg, dl, maxum):
    offset = cfg − dl
    if offset < 0
        return no_dl
    if offset==0:
        computed = cfg+delta
        return check_(computed, maxum)
    if offset<delta:
        computed = delta + min(cfg−1, dl)
        return check_(computed, maxum)
    if offset==delta:
        computed = dl+delta+1
        return check_(computed, maxum)
    if offset>delta:
        computed = cfg+1
```

```
return check_(computed, maxum)
return illegal_case
```

TDD implementations can cause different latencies. There is a presumption that an eNB needs at least 1 microframe to process HARQ-ACK bits and to schedule a downlink transmission. For example, if HARQ-ACK bits are transmitted by a UE in microframe 6, the eNB would need a portion of microframe 7 to process those HARQ-ACK bits, to determine what to transmit in microframe 0, and to prepare that transmission.

TABLE 9

Example of latencies for transmission in subframe k, Dn is the nth microframe of the next subframe (k + 1). #m is the minimum delay where m is the multiple of 0.125 ms.

| Config-uration | DL 0 | DL 1 | DL 2 | DL 3 | DL 4 | DL 5 | DL 6 |
|---|---|---|---|---|---|---|---|
| 0 | #8, D0 | — | — | — | — | — | — |
| 1 | #8, D0 | #7, D0 | — | — | — | — | — |
| 2 | #8, D0 | #7, D0 | #6, D0 | — | — | — | — |
| 3 | #8, D0 | #7, D0 | #6, D0 | #5, D1 | — | — | — |
| 4 | #8, D0 | #7, D0 | #6, D0 | #5, D1 | #5, D1 | — | — |
| 5 | #8, D0 | #7, D0 | #6, D0 | #5, D1 | #5, D1 | #4, D1 | — |
| 6 | #9, D1 | #8, D1 | #7, D1 | #6, D1 | #5, D1 | #4, D1 | * |

Figure 13:
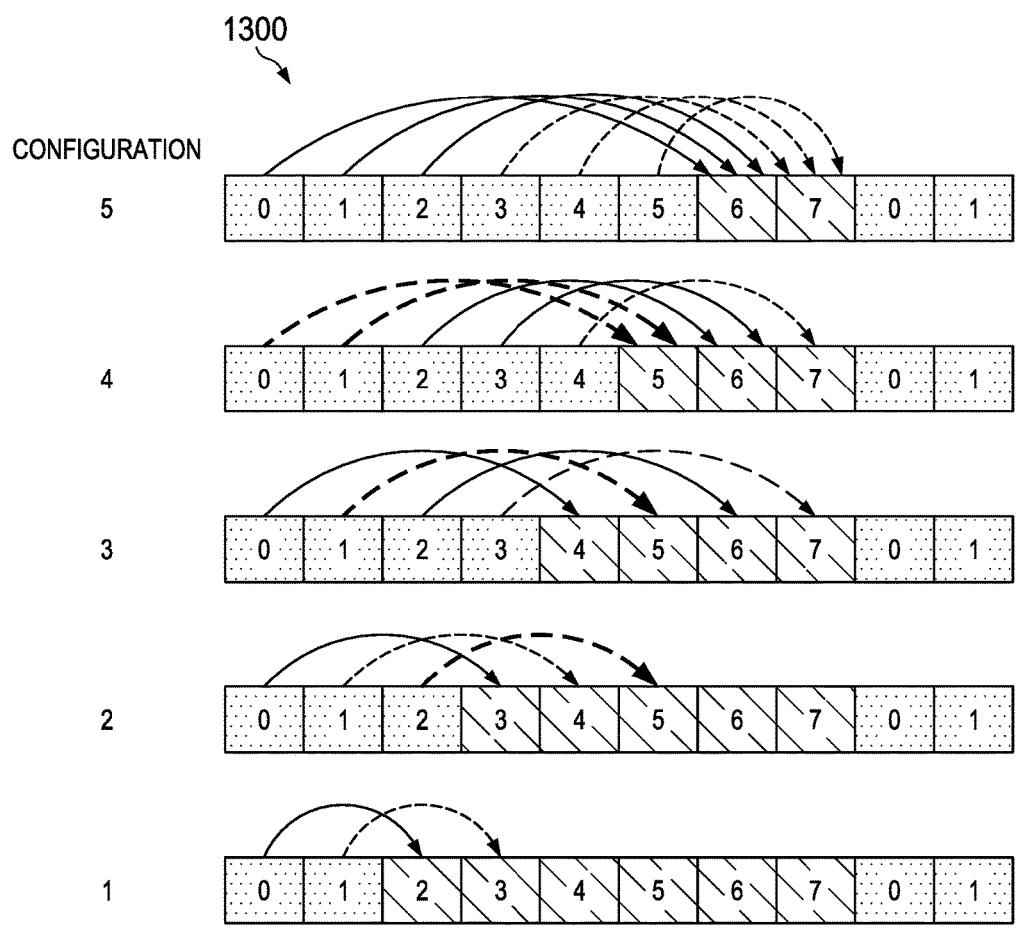
FIG. 13 illustrates an embodiment of DL HARQ timing.

FIG. 13 illustrates an embodiment of DL HARQ timing 1300. With respect to the n+2 rule, restricted uplink-downlink configurations, in one example of DL HARQ timing, the uplink-downlink configuration has at least 2 DL microframes and at least 2 UL microframes, as shown in FIG. 13. Table 10 captures some of the HARQ-ACK timing as well as the number of HARQ processes. With uplink-downlink configuration 5, there can be 6 HARQ processes (allowing one UE to receive packets in 6 consecutive microframes). In this example, there is a minimum of 2 microframe delay from the reception of a downlink packet and the transmission of the HARQ-ACK bits. For certain uplink-downlink configurations (e.g., #4 and #5), the uplink microframe for transmitting HARQ-ACK bits corresponds to several downlink microframes (e.g., HARQ-ACK bits for microframe 0 (DL 0) and microframe 1 (DL 1) are transmitted in microframe 5 (UL 5)). In one example, when a UE receives multiple downlink packets in a subframe and the HARQ-ACK bits for those packets are scheduled for the same uplink microframe, the UE may be configured by the eNB to concatenate the HARQ-ACK bits for each of the downlink packets (multiplex) or to perform a logical AND of HARQ-ACK bits for each of the downlink packets (bundle), where a logical AND of two bits is 1 when both bits are equal to 1, 0 otherwise. Another possible rule for spatial multiplexing/bundling is based on the microframe configuration. If uplink-downlink configuration x is used, then for data transmission on certain microframes, spatial multiplexing/bundling is used.

TABLE 10

Uplink microframe timing for HARQ-ACK, n + 2 rule

| Uplink-downlink configuration | Maximum Number of DL HARQ processes | DL 0 | DL 1 | DL 2 | DL 3 | DL 4 | DL 5 |
|---|---|---|---|---|---|---|---|
| 1 | 2 | UL 2 | UL 3 | — | — | — | — |
| 2 | 3 | UL 3 | UL 4 | UL 5 | — | — | — |
| 3 | 4 | UL 4 | UL 5 | UL 6 | UL 7 | — | — |
| 4 | 5 | UL 5 | UL 5 | UL 6 | UL 6 | UL 7 | — |
| 5 | 6 | UL 6 | UL 6 | UL 6 | UL 7 | UL 7 | UL 7 |

Another possibility is to add a field in the DCI to indicate on which subframe the packet is to be acknowledged. One bit could indicate if a pre-determined subframe is to be used for sending the ACK/NAK. Depending on the value of this bit, the UE knows where to send the ACK/NAK:

If bit value is '0', the UE uses a pre-defined implicit rule (e.g., n, n+2) for sending the ACK, and If bit value is '1', the UE uses a pre-defined microframe for sending the ACK (e.g., microframe #7).

Note that instead of being a specific value, the bit could be toggled. The pre-defined microframe could be obtained through pre-configuration, configuration through RRC signaling, physical layer signaling (DCI), etc.

If the UE is configured by the eNB to concatenate the HARQ-ACK bits for each of the downlink packets (multiplex) or to perform a logical AND of HARQ-ACK bits for each of the downlink packets (bundle), the UE will always use multiplexing or bundling of the HARQ-ACK bits.

If the UE is not configured by the eNB to use multiplexing or bundling, in each microframe the eNB can signal multiplexing or bundling to the UE. One additional bit can be used in the DCI to indicate to use multiplexing or bundling:

If bit value is '0', the UE concatenates the HARQ-ACK bits for each of the downlink packets, and If bit value is '1', the UE performs a logical AND of HARQ-ACK bits for each of the downlink packets.

An alternative is for the eNB to send the microframe index when the ACK/NAK is sent. Note that this alternative has higher overhead than one-bit indicators. The index can be for the same subframe or it can be in the next subframe. Example, consider the case if DL packet is in microframe 6. In an embodiment, the ACK is sent in the next subframe.

Figure 14:
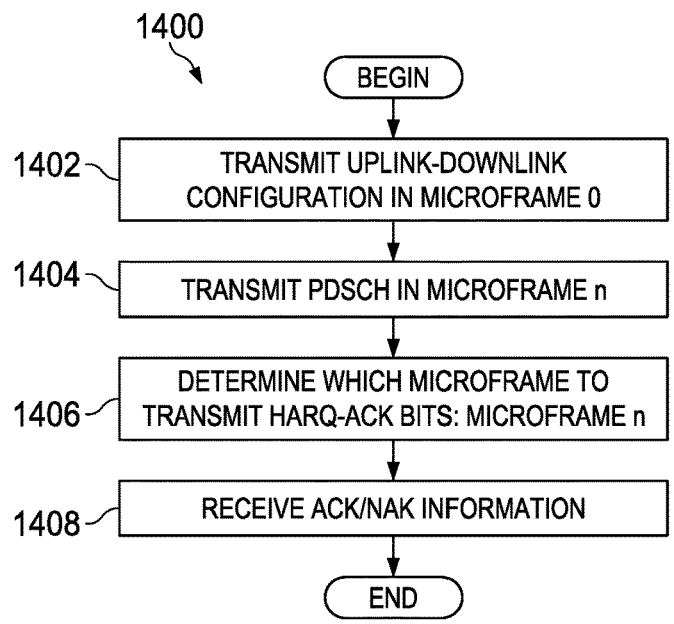
FIG. 14 illustrates an embodiment method in an eNB for HARQ-ACK flow.
Figure 15:
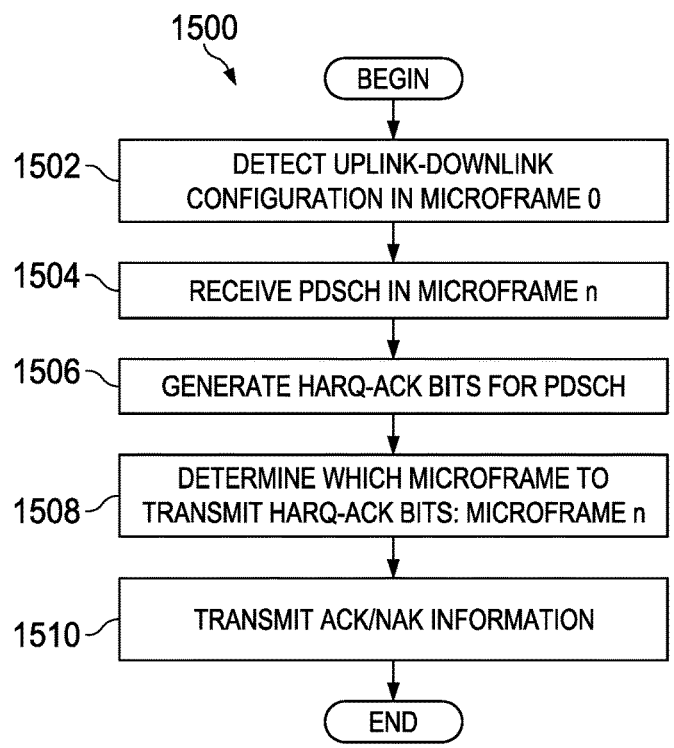
FIG. 15 illustrates an embodiment method in a UE for HARQ-ACK flow.

FIG. 14 and FIG. 15 show UE and eNB example operations for variable uplink-downlink configurations, respectively.

FIG. 14 illustrates an embodiment method 1400 in an eNB for HARQ-ACK flow. For the eNB operation in FIG. 14, the method 1400 begins at block 1402 where the eNB transmits the uplink-downlink configuration for the current subframe in microframe 0. In one example, the transmission can use a waveform or be DCI-based. At block 1404, in microframe n, the eNB transmits the PDSCH. Microframe n is in the same subframe as microframe 0 and is a downlink (or special) microframe. Typically the (E)PDCCH corresponding to the PDSCH is transmitted in the same microframe as the PDSCH. In some instances, the (E)PDCCH can be transmitted in an earlier microframe. For semi-persistent scheduling, there may be no (E)PDCCH corresponding to the PDSCH. In block 1406, based on the timing rules (e.g., n+2), the uplink-downlink configuration for the current subframe, and microframe n, the eNB determines which microframe (microframe m) the HARQ-ACK bits will be transmitted by the UE. Note the uplink-downlink configuration for the next subframe may also be considered in determining microframe m. The eNB may also make the determination based on whether there are more PDSCH transmissions to that UE in the same subframe. This can determine whether HARQ-ACK bits are bundled or multiplexed. Another consideration is whether TTI bundling is used for ACK/NAK information. TTI bundling is the repetition of transmission of ACK/NAK information by a UE and can improve coverage by allowing the eNB to combine several ACK/NAK information (to boost SNR). Note that the eNB may make the determination of microframe m before it transmits the PDSCH in microframe n. The eNB may have to change the DCI fields of the (E)PDCCH accordingly so that the UE knows when to transmit the HARQ-ACK bits corresponding to the PDSCH in microframe n. At block 1408, in microframe m (or multiple microframes if TTI bundling is used), the eNB receives the ACK/NAK information containing the HARQ-ACK bits for the transmission of PDSCH in microframe n, after which, the method 1400 ends.

FIG. 15 illustrates an embodiment method 1500 in a UE for HARQ-ACK flow. For the UE operation in FIG. 15, at block 1502, the UE receives the uplink-downlink configuration for the current subframe in microframe 0. In one example, the uplink-downlink configuration can be conveyed using a waveform or by DCI. At block 1504, in microframe n, the UE receives the PDSCH. At block 1506, the UE will generate HARQ-ACK bits after attempting to decode the PDSCH. For example, a HARQ-ACK bit value of "1" can indicate successful reception of the PDSCH. A "0" can indicate other information (e.g., unsuccessful decoding, missed (E)PDCCH). Typically, the (E)PDCCH corresponding to the PDSCH is received in the same microframe as the PDSCH. In some instances, the (E)PDCCH can be received in an earlier microframe. At block 1508, based on the timing rules (e.g., n+2), the uplink-downlink configuration for the current subframe, and microframe n, the UE determines which microframe (microframe m) the ACK/NAK information containing the HARQ-ACK bits will be transmitted. Note the uplink-downlink configuration for the next subframe may also be considered in determining microframe m. The UE may have to use bundling or multiplexing of HARQ-ACK bits when there are multiple HARQ-ACK bits (corresponding to different PDSCH). Another consideration is TTI bundling. Note that the (E)PDCCH may contain fields indicating when and/or which resources are used for ACK/NAK information transmission. At block 1510, in microframe m (or multiple microframes if TTI bundling is used), the UE transmits the ACK/NAK information containing the HARQ-ACK bits for the reception of PDSCH in microframe n, after which, the method 1500 may end.

Figure 16:
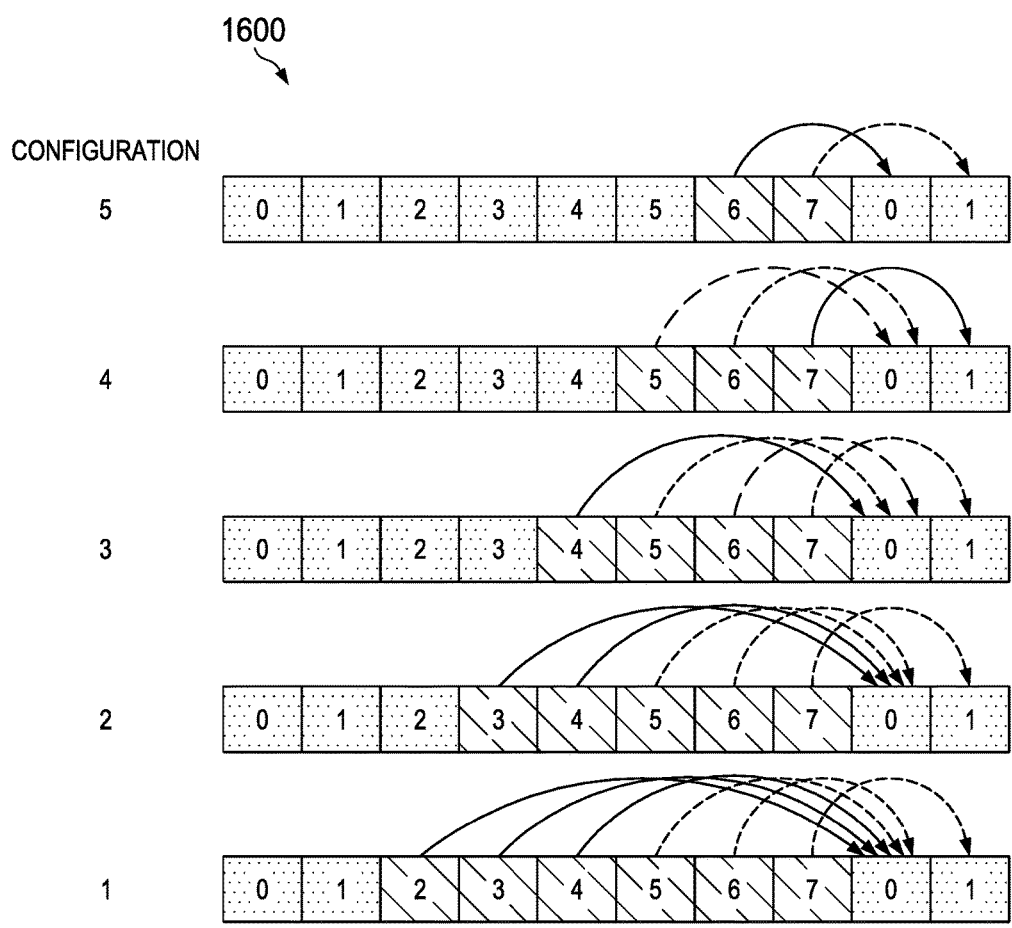
FIG. 16 illustrates an embodiment of UL HARQ timing.

FIG. 16 illustrates an embodiment of UL HARQ timing 1600. With respect to UL HARQ, in one example the uplink-downlink configuration has at least 2 DL microframes and at least 2 UL microframes, as shown in FIG. 16. Table 11 captures some of the HARQ-ACK timing as well as the number of HARQ processes. With uplink-downlink configuration 5, there can be 2 processes (allowing one UE to transmit packets in 6 consecutive microframes). In this example, there is a minimum of 2 microframe delay from the transmission of an uplink packet and the rescheduling for UL grants (transmission of HARQ-ACK bits by the eNB can be indicated by the DCI for UL grants).

TABLE 11

Downlink microframe timing for HARQ-ACK

| Uplink-downlink configuration | Maximum Number of DL HARQ processes | UL 2 | UL 3 | UL 4 | UL 5 | UL 6 | UL 7 |
|---|---|---|---|---|---|---|---|
| 1 | 6 | — | — | — | — | DL 0 | DL 1 |
| 2 | 5 | — | — | — | DL 0 | DL 0 | DL 1 |
| 3 | 4 | — | — | DL 0 | DL 0 | DL 0 | DL 1 |
| 4 | 3 | — | DL 0 | DL 0 | DL 0 | DL 0 | DL 1 |
| 5 | 2 | DL 0 | DL 0 | DL 0 | DL 0 | DL 0 | DL 1 |

Figure 17:
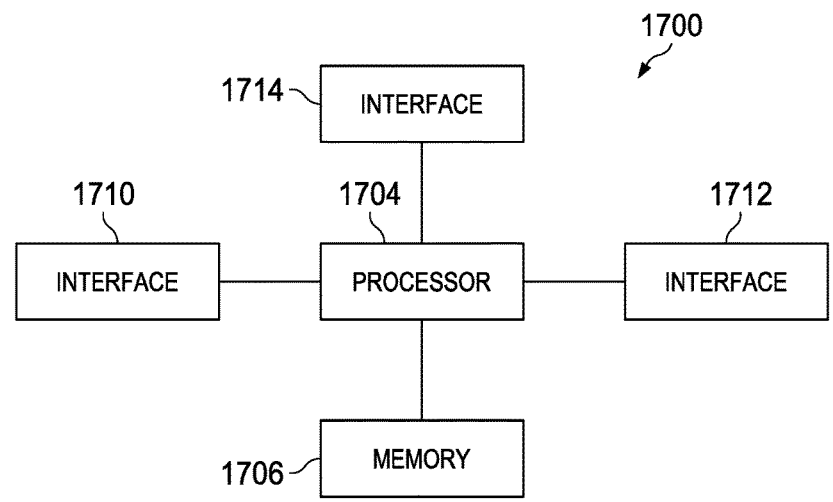
FIG. 17 illustrates a block diagram of an embodiment processing system for performing methods described herein.

FIG. 17 illustrates a block diagram of an embodiment processing system 1700 for performing methods described herein, which may be installed in a host device. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 1704. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 1704 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 17, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1710, 1712, 1714 connects the processing system 1700 to a transceiver adapted to transmit and receive signaling over the telecommunications network.

Figure 18:
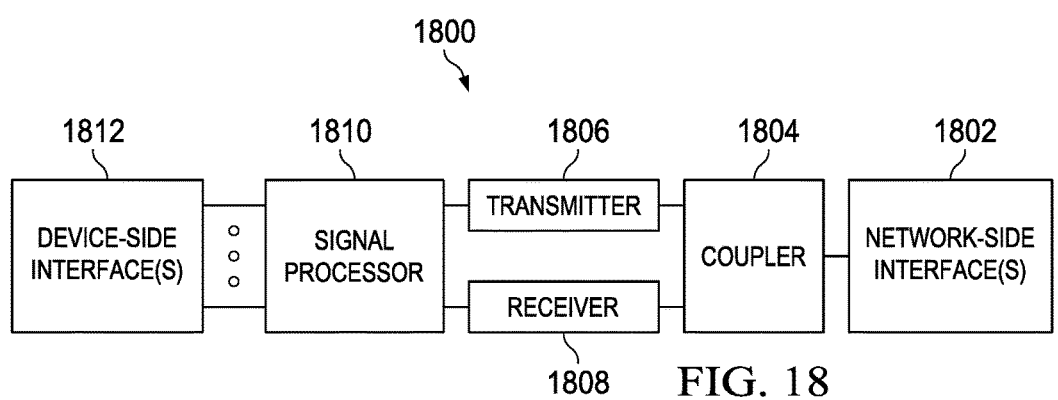
FIG. 18 illustrates a block diagram of an embodiment transceiver adapted to transmit and receive signaling over a telecommunications network.

FIG. 18 illustrates a block diagram of a transceiver 1800 adapted to transmit and receive signaling over a telecommunications network. The transceiver 1800 may be installed in a host device. As shown, the transceiver 1800 includes a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface(s) 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 includes one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 19:
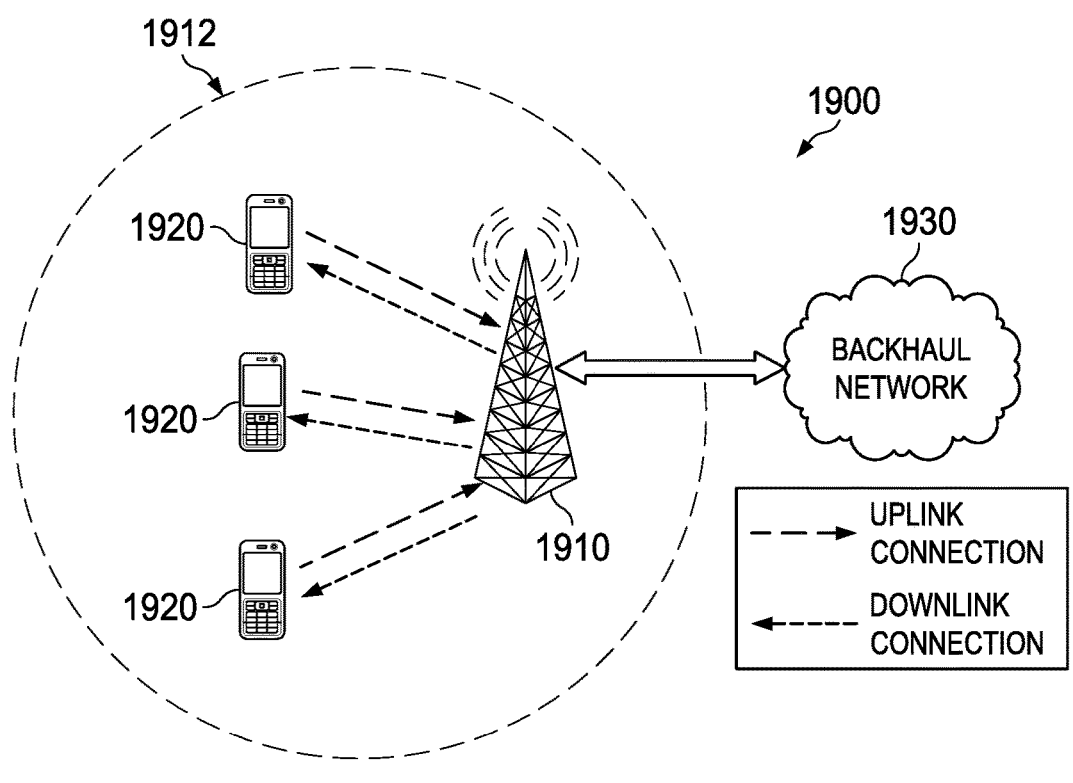
FIG. 19 illustrates an embodiment network for communicating data in which the disclosed methods and systems may be implemented

FIG. 19 illustrates an embodiment network 1900 for communicating data in which the disclosed methods and systems may be implemented. The network 1900 includes an access point (AP) 1910 having a coverage area 1912, a plurality of stations (STAs) 1920, and a backhaul network 1930. In an embodiment, the AP may be implemented as transceiver 1800 shown in FIG. 18. In an embodiment, the STAs 1920 may be implemented as, for example, processing system 1700 shown in FIG. 17. As used herein, the term AP may also be referred to as a TP and the two terms may be used interchangeably throughout this disclosure. The AP 1910 may include any component capable of providing wireless access by, inter alia, establishing uplink (dashed line) and/or downlink (dotted line) connections with the STAs 1920. The STAs 1920 may include any component capable of establishing a wireless connection with the AP 1910. Examples of STAs 1920 include mobile phones, tablet computers, and laptop computers. The backhaul network 1930 may be any component or collection of components that allow data to be exchanged between the AP 1910 and a remote end (not shown). In some embodiments, the network 1900 may include various other wireless devices, such as relays, femtocells, etc.

An embodiment method in a communications controller for transmitting a packet to a wireless device includes signaling, by the communications controller, an uplink/downlink (UL/DL) configuration to the wireless device, wherein the UL/DL configuration indicates a quantity of uplink microframes in a group of microframes, wherein each subframe includes a plurality of microframes, and wherein the group of microframes includes a consecutive sequence downlink microframes and a consecutive sequence of uplink microframes. The method also includes transmitting, by the communications controller, the packet to the wireless device in one downlink microframe of the consecutive sequence of downlink microframes. The method further includes receiving, by the communications controller, an acknowledgement of the packet in an uplink microframe, wherein the uplink microframe is determined in accordance with the one downlink microframe and the uplink-downlink configuration, and wherein the acknowledgement is received in a same subframe as a subframe utilized for transmitting the packet to the wireless device.

In an embodiment, the consecutive sequence of downlink microframes includes a special microframe, and wherein the special microframe includes at least one downlink symbol and a guard period. In an embodiment, the uplink microframes are further determined in accordance with a next uplink-downlink configuration of a next group of microframes. In an embodiment, the quantity of uplink microframes is related to the consecutive sequence of uplink microframes. In an embodiment, a subframe is divided into eight microframes, wherein K first microframes are UL. In an embodiment, a plurality of subframes comprise a supermicroframe, wherein a K first microframes in a first subframe are DL microframes and a first microframe in each of the subsequent subframes are a DL microframe or an UL microframe. In an embodiment, the method also includes signaling the UL/DL configuration using a physical control format indicator channel (PCFICH)-like channel. In an embodiment, signaling the UL/DL configuration using a physical control format indicator channel (PCFICH)-like channel includes sending the PCFICH-like channel on at least one reserved resource element (RE) in a first microframe of a first subframe. In an embodiment, the first microframe includes microframe 0 and the first subframe includes subframe 0. In an embodiment, the method includes explicitly signaling a subframe in which to send an acknowledgement/negative acknowledgement (ACK/NAK). In an embodiment, the explicit signaling includes one bit indicating whether to send the ACK/NACK using an implicit rule or a pre-determined microframe.

An embodiment communications controller includes a processor and a non-transitory computer readable storage medium storing programming for execution by the processor. The programming includes instructions for signaling an uplink/downlink (UL/DL) configuration to the wireless device, wherein the UL/DL configuration indicates a quantity of uplink microframes in a group of microframes. Each subframe includes a plurality of microframes. The group of microframes includes a consecutive sequence downlink microframes and a consecutive sequence of uplink microframes. The programming also includes instructions for transmitting the packet to the wireless device in one downlink microframe of the consecutive sequence of downlink microframes. The programming further includes instructions for receiving an acknowledgement of the packet in an uplink microframe. The uplink microframe is determined in accordance with the one downlink microframe and the uplink-downlink configuration. The acknowledgement is received in a same subframe as a subframe utilized for transmitting the packet to the wireless device.

In an embodiment, the consecutive sequence of downlink microframes includes a special microframe, and wherein the special microframe includes at least one downlink symbol and a guard period. In an embodiment, the uplink microframes are further determined in accordance with a next uplink-downlink configuration of a next group of microframes. In an embodiment, the quantity of uplink microframes is related to the consecutive sequence of uplink microframes. In an embodiment, a subframe is divided into eight microframes, wherein K first microframes are UL. In an embodiment, a plurality of subframes comprise a supermicroframe, wherein a K first microframes in a first subframe are DL microframes and a first microframe in each of the subsequent subframes are a DL microframe or an UL microframe. In an embodiment, the programming further includes instructions for signaling the UL/DL configuration using a physical control format indicator channel (PCFICH)-like channel. In an embodiment, signaling the UL/DL configuration using a physical control format indicator channel (PCFICH)-like channel includes sending the PCFICH-like channel on at least one reserved resource element (RE) in a first microframe of a first subframe. In an embodiment, the first microframe includes microframe 0 and the first subframe includes subframe 0. In an embodiment, the programming further includes instructions for explicitly signaling a subframe in which to send an acknowledgement/negative acknowledgement (ACK/NAK).

An embodiment method in a wireless device for communicating with a communications controller includes receiving, by the wireless device, an uplink/downlink (UL/DL) configuration from the communications controller. The UL/DL configuration indicates a quantity of uplink microframes in a group of microframes. Each subframe includes a plurality of microframes. The group of microframes includes a consecutive sequence downlink microframes and a consecutive sequence of uplink microframes. The method also includes receiving, by the wireless device, a packet from the communications controller in one downlink microframe of the consecutive sequence of downlink microframes. The method further includes transmitting, by the wireless device, an acknowledgement of the packet in an uplink microframe. The uplink microframe is determined in accordance with the one downlink microframe and the uplink-downlink configuration. The acknowledgement is transmitted in a same subframe as a subframe utilized for receiving the packet from the communications controller. In an embodiment, the consecutive sequence of downlink microframes includes a special microframe, and wherein the special microframe includes at least one downlink symbol and a guard period. In an embodiment, the uplink microframes are further determined in accordance with a next uplink-downlink configuration of a next group of microframes. In an embodiment, a subframe is divided into eight microframes, wherein K first microframes are UL. In an embodiment, a plurality of subframes comprise a supermicroframe, wherein a K first microframes in a first subframe are DL microframes and a first microframe in each of the subsequent subframes are a DL microframe or an UL microframe.

An embodiment wireless device includes a processor and a non-transitory computer readable storage medium storing programming for execution by the processor. The programming includes instructions for receiving an uplink/downlink (UL/DL) configuration from the communications controller. The UL/DL configuration indicates a quantity of uplink microframes in a group of microframes. Each subframe includes a plurality of microframes. The group of microframes includes a consecutive sequence of downlink microframes and a consecutive sequence of uplink microframes. The programming also includes instructions for receiving a packet from the communications controller in one downlink microframe of the consecutive sequence of downlink microframes. The programming also includes transmitting an acknowledgement of the packet in an uplink microframe. The uplink microframe is determined in accordance with the one downlink microframe and the uplink-downlink configuration. The acknowledgement is transmitted in a same subframe as a subframe utilized for receiving the packet from the communications controller. In an embodiment, the consecutive sequence of downlink microframes includes a special microframe. The special microframe includes at least one downlink symbol and a guard period. In an embodiment, the uplink microframes are further determined in accordance with a next uplink-downlink configuration of a next group of microframes. In an embodiment, a subframe is divided into eight microframes. The K first microframes are UL. In an embodiment, a plurality of subframes comprise a supermicroframe, wherein a K first microframes in a first subframe are DL microframes and a first microframe in each of the subsequent subframes are a DL microframe or an UL microframe.

It should be appreciated that one or more steps of the embodiment methods provided herein may be performed by corresponding units or modules. For example, a signal or packet may be transmitted by a transmitting unit or a transmitting module. A signal or packet may be received by a receiving unit or a receiving module. A signal or packet may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

The following references are related to subject matter of the present application. Each of these references is incorporated herein by reference in its entirety:

3GPP TS 36.211 version 10.0.0, Release 10, "LTE; Evolved Universal Terrestrial Radio Access (E-UTRA); Physical channels and modulation," (January 2011).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:

signaling, by a communications controller, a higher layer signal indicating a plurality of downlink microframes and a plurality of uplink microframes;

signaling, by the communications controller, a first downlink control information (DCI) message that includes a first indicator for a downlink microframe, in the plurality of downlink microframes, for transmitting a packet to a wireless device and a second indicator for an uplink microframe, in the plurality of uplink microframes, for receiving an acknowledgement associated with the packet from the wireless device; and receiving, by the communications controller, the acknowledgement in the uplink microframe.

2. The method of claim 1, wherein a special microframe follows the plurality of downlink microframes and precedes the plurality of uplink microframes, the special microframe comprises at least one downlink symbol and a guard period.

3. The method of claim 1, wherein the DCI is signaled on a physical downlink control channel (PDCCH) located in a common search space being monitored by the wireless device.

4. The method of claim 1, wherein the downlink microframe comprises a cyclic prefix, and wherein a duration of the cyclic prefix is based on a sampling rate, a subcarrier spacing, or a number of microframes in a subframe.

5. The method of claim 1, wherein the acknowledgement includes a separate acknowledgement indications for each of a plurality of packets transmitted over the plurality of downlink microframes.

6. The method of claim 1, further comprising:
signaling a second DCI message that includes a third indicator for a second uplink microframe, in the plurality of uplink microframes, for receiving an uplink data transmission from the wireless device.

7. A communications controller comprising:
a non-transitory memory storage comprising instructions; and
a processor in communication with the non-transitory memory storage, wherein the processor executes the instructions to:
signal a higher layer signal indicating a plurality of downlink microframes and a plurality of uplink microframes;
signal a first downlink control information (DCI) message that includes a first indicator for a downlink microframe, in the plurality of downlink microframes, for transmitting a packet to a wireless device and a second indicator for an uplink microframe, in the plurality of uplink microframes, for receiving an acknowledgement associated with the packet from the wireless device; and
receive the acknowledgement in the uplink microframe.

8. The communications controller of claim 7, wherein a special microframe follows the plurality of downlink microframes and precedes the plurality of uplink microframes, the special microframe comprises at least one downlink symbol and a guard period.

9. The communications controller of claim 7, wherein the DCI is signaled on a physical downlink control channel (PDCCH) located in a common search space being monitored by the wireless device.

10. The communications controller of claim 7, wherein the downlink microframe comprises a cyclic prefix, and wherein a duration of the cyclic prefix is based on a sampling rate, a subcarrier spacing, or a number of microframes in a subframe.

11. The communications controller of claim 7, wherein the acknowledgement includes a separate acknowledgement indications for each of a plurality of packets transmitted over the plurality of downlink microframes.

12. The communications controller of claim 7, wherein the programming further includes instructions to:
signal a second DCI message that includes a third indicator for a second uplink microframe, in the plurality of uplink microframes, for receiving an uplink data transmission from the wireless device.

13. A method comprising:
receiving, by a wireless device, a higher layer signal indicating a plurality of downlink microframes and a plurality of uplink microframes;
receiving, by the wireless device, a first downlink control information (DCI) message that includes a first indicator for a downlink microframe, in the plurality of downlink microframes, for receiving a wireless packet from a communications controller and a second indicator for an uplink microframe, in the plurality of uplink microframes, for transmitting an acknowledgement associated with the packet to the communications controller; and
transmitting, by the wireless device, the acknowledgement in the uplink microframe.

14. The method of claim 13, wherein a special microframe follows the plurality of downlink microframes and precedes the plurality of uplink microframes, the special microframe comprises at least one downlink symbol and a guard period.

15. The method of claim 13, wherein the DCI is signaled on a physical downlink control channel (PDCCH) located in a common search space being monitored by the wireless device.

16. The method of claim 13, wherein the downlink microframe comprises a cyclic prefix, and wherein a duration of the cyclic prefix is based on a sampling rate, a subcarrier spacing, or a number of microframes in a subframe.

17. The method of claim 13, wherein the acknowledgement includes a separate acknowledgement indications for each of a plurality of packets transmitted over the plurality of downlink microframes.

18. The method of claim 13, further comprising:
receiving a second DCI message that includes a third indicator for a second uplink microframe, in the plurality of uplink microframes, for transmitting an uplink data transmission to the communications controller.

19. A wireless device comprising:
a non-transitory memory storage comprising instructions; and
a processor in communication with the non-transitory memory storage, wherein the processor executes the instructions to:
receive a higher layer signal that indicates a plurality of downlink microframes and a plurality of uplink microframes;
receive a first downlink control information (DCI) message that includes a first indicator for a downlink microframe, in the plurality of downlink microframes, for receiving a wireless packet from a communications controller and a second indicator for an uplink microframe, in the plurality of uplink microframes, for transmitting an acknowledgement associated with the packet to the communications controller; and
transmit the acknowledgement in the uplink microframe.

20. The wireless device of claim 19, wherein a special microframe follows the plurality of downlink microframes and precedes the plurality of uplink microframes, the special microframe comprises at least one downlink symbol and a guard period.

21. The wireless device of claim 19, wherein the DCI is signaled on a physical downlink control channel (PDCCH) located in a common search space being monitored by the wireless device.

22. The wireless device of claim 19, wherein the downlink microframe comprises a cyclic prefix, and wherein a duration of the cyclic prefix is based on a sampling rate, a subcarrier spacing, or a number of microframes in a subframe.

23. The wireless device of claim 19, wherein the acknowledgement includes a separate acknowledgement indications for each of a plurality of packets transmitted over the plurality of downlink microframes.

24. The wireless device of claim 19, wherein the programming further includes instructions to:
receive a second DCI message that includes a third indicator for a second uplink microframe, in the plurality of uplink microframes, for transmitting an uplink data transmission to the communications controller.

* * * * *